(12) United States Patent
Zuraski, Jr. et al.

(10) Patent No.: US 6,260,134 B1
(45) Date of Patent: Jul. 10, 2001

(54) FIXED SHIFT AMOUNT VARIABLE LENGTH INSTRUCTION STREAM PRE-DECODING FOR START BYTE DETERMINATION BASED ON PREFIX INDICATING LENGTH VECTOR PRESUMING POTENTIAL START BYTE

(75) Inventors: Gerald D. Zuraski, Jr.; Syed F. Ahmed, both of Austin; Paul K. Miller, McKinney, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/184,750

(22) Filed: Nov. 2, 1998

(51) Int. Cl.[7] ....................................... G06F 9/38
(52) U.S. Cl. .......................... 712/210; 712/204; 712/213
(58) Field of Search .................................. 712/204, 210, 712/213

(56) References Cited

U.S. PATENT DOCUMENTS

| | | | |
|---|---|---|---|
| 5,586,277 | 12/1996 | Brown et al. ......................... | 712/210 |
| 5,619,666 | 4/1997 | Coon et al. ........................... | 712/208 |
| 5,758,116 | * 5/1998 | Lee et al. .............................. | 712/210 |
| 5,809,272 | * 9/1998 | Thusoo et al. ........................ | 712/210 |
| 5,809,273 | 9/1998 | Favor et al. .......................... | 712/210 |
| 5,819,059 | 10/1998 | Tran ..................................... | 712/213 |
| 5,822,558 | 10/1998 | Tran ..................................... | 712/213 |
| 5,845,099 | * 12/1998 | Krishnamurthy et al. ........... | 712/204 |
| 5,941,980 | * 8/1999 | Shang et al. ......................... | 712/204 |
| 5,948,096 | * 4/1999 | Ginosar et al. ...................... | 712/210 |

FOREIGN PATENT DOCUMENTS 0 417 013    3/1991    (EP) .

* cited by examiner

*Primary Examiner*—Kenneth S. Kim
(74) *Attorney, Agent, or Firm*—Conley, Rose & Tayon, PC; Dan R. Christen

(57) ABSTRACT

A predecode unit is configured to predecode a fixed number of instruction bytes of variable length instructions per clock cycle. The predecode unit outputs predecode bits which identify the start byte of an instruction. An instruction alignment unit uses the start bits to dispatch the instructions to a plurality of decode units that form fixed issue positions. In one embodiment, the predecode unit identifies a plurality of length vectors. Each length vector is associated with one of the instruction bytes predecoded in a clock cycle and identifies the length of an instruction if an instruction starts at the instruction byte corresponding to the length vector. A tree circuit determines in which instruction bytes instructions start.

20 Claims, 18 Drawing Sheets

|     | mod | reg | r/m |
| --- | --- | --- | --- |
| (a) | 11 | rrr | reg |

|     | mod | reg | r/m |
| --- | --- | --- | --- |
| (b) | 00 | rrr | reg |

(c)

| mod | reg | r/m | 4-byte offset |
| --- | --- | --- | --- |
| 00 | rrr | 101 | |

(d)

| mod | reg | r/m | 1-byte offset |
| --- | --- | --- | --- |
| 01 | rrr | reg | |

(e)

| mod | reg | r/m | 4-byte offset |
| --- | --- | --- | --- |
| 10 | rrr | 101 | |

(f)

| mod | reg | r/m | sci | idx | base |
| --- | --- | --- | --- | --- | --- |
| 00 | rrr | 101 | ss | xxx | bbb |

(g)

| mod | reg | r/m | sci | idx | base | 1-byte offset |
| --- | --- | --- | --- | --- | --- | --- |
| 00 | rrr | 100 | ss | xxx | bbb | |

(h)

| mod | reg | r/m | sci | idx | base | 4-byte offset |
| --- | --- | --- | --- | --- | --- | --- |
| 00 | rrr | 100 | ss | xxx | bbb | |

*FIG. 1C*

FIXED SHIFT AMOUNT VARIABLE LENGTH INSTRUCTION STREAM PRE-DECODING FOR START BYTE DETERMINATION BASED ON PREFIX INDICATING LENGTH VECTOR PRESUMING POTENTIAL START BYTE

BACKGROUND OF THE INVENTION

1. Field of the Invention

This invention relates to superscalar microprocessors and, more particularly, to the predecoding of variable byte-length computer instructions within high performance and high frequency superscalar microprocessors.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors that execute x86 instructions. Such superscalar microprocessors achieve relatively high performance characteristics while advantageously maintaining backwards compatibility with the vast amount of existing software developed for previous microprocessor generations such as the 8086, 80286, 80386, 80486, Pentium™, K5™, Pentium II™, and K6™.

The x86 instruction set is relatively complex and is characterized by a plurality of variable byte-length instructions. A generic format illustrative of the x86 instruction set is shown in FIG. 1A. As illustrated in the figure, an x86 instruction consists of from one to fourteen optional prefix bytes 102, followed by an operation code (opcode) field 104, an optional addressing mode (ModR/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (ModR/M) byte 106 specifies the registers used as well as memory addressing modes. The register field of the ModR/M byte alternatively may be used as an opcode extension, or sub-opcode. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to six bytes in length, contains a constant used as an instruction operand. The 80286 sets a maximum length for an instruction at 10 bytes, while the 80386, 80486, Pentium™, K5™, Pentium II™, and K6™ allow instruction lengths of up to 15 bytes.

Referring now to FIG. 1B, several different variable byte-length x86 instruction formats are shown. The shortest x86 instruction is only one byte long, and comprises a single opcode byte as shown in format (a). For certain instructions, the byte containing the opcode field also contains a register field as shown in formats (b), (c) and (e). Format 0) shows an instruction with two opcode bytes. An optional ModR/M byte follows opcode bytes in formats (d), (f), (h), and (0). Immediate data follows opcode bytes in formats (e), (g), (i), and (k), and follows a ModR/M byte in formats (f) and (h). FIG. 1C illustrates several possible addressing mode formats (a)–(h). Formats (c), (d), (e), (g), and (h) contain ModR/M bytes with offset (i.e., displacement) information. An SIB byte is used in formats (f), (g), and (h).

The complexity of the x86 instruction set poses difficulties in implementing high performance x86 compatible superscalar microprocessors. One difficulty arises from the fact that instructions must be aligned with respect to the parallel-coupled instruction decoders of such processors before proper decode can be effectuated. In contrast to most RISC instruction formats, since the x86 instruction set consists of variable byte-length instructions, the start bytes of successive instructions within a line are not necessarily equally spaced, and the number of instructions per line is not fixed. As a result, employment of simple, fixed-length shifting logic cannot in itself solve the problem of instruction alignment.

Superscalar microprocessors have been proposed that employ instruction predecoding techniques to help solve the problem of quickly aligning, decoding and executing a plurality of variable byte-length instructions in parallel. In one such superscalar microprocessor, when instructions are written within the instruction cache from an external main memory, a predecoder appends several predecode bits (referred to collectively as a predecode tag) to each byte. These bits may indicate whether the byte is the start and/or end byte of an x86 instruction, the number of microinstructions required to implement the x86 instruction, and the location of opcodes and prefixes.

Unfortunately, predecode units experience the same difficulties in aligning instructions as decode units. In one implementation, a predecode unit attempts to predecode one instruction per clock cycle. A multiplexer routes instruction bytes to the predecode unit, which determines the length of the instruction and routes the instruction length to the multiplexer, which routes the bytes subsequent to the previously predecoded instruction to the predecode unit to be predecoded in the next clock cycle. Because the instruction length is variable, the multiplexer must be able to shift the instruction bytes from 1 to 15 bytes, which increases the complexity of the multiplexer. Further, the time to detect the length of the instruction, route the instruction length to the multiplexer, and shift the instruction bytes by the appropriate number of positions is a time consuming operation that may limit the performance of the predecode unit and consequently limit the performance of the microprocessor.

SUMMARY OF THE INVENTION

The problems outlined above are in large part solved by a predecode unit configured to predecode a fixed number of instruction bytes of variable length instructions per clock cycle. The predecode unit outputs predecode bits which identify whether any of the predecoded instruction bytes are the start byte of an instruction. An instruction alignment unit then uses the start bits to dispatch the variable byte-length instructions to a plurality of decode units that form fixed issue positions within a processor. By predecoding a fixed number of instruction bytes per clock cycle, the multiplexer that routes instruction bytes to the predecode unit shifts instructions bytes by a fixed number, which greatly simplifies the multiplexer. Furthermore, the multiplexing operation may be performed in parallel with the predecode operation because the number of byte positions by which the multiplexer shifts the instruction bytes is independent of the predecode operation. Both of these features accommodate very high frequencies of operation.

In one embodiment, the predecode unit identifies a plurality of length vectors. Each length vector is associated with one of the instruction bytes predecoded in a clock cycle. The length vector identifies the length of an instruction if an instruction starts at the instruction byte corresponding to the length vector. A tree circuit determines in which instruction bytes instructions start. The length vector corresponding to the instruction byte in which an instruction starts identifies the instruction byte in which a subsequent instruction starts (i.e., the subsequent start byte). If the subsequent start byte is outside of the fixed number of instruction bytes predecoded during that clock cycle, the tree circuit stores the information until the subsequent start byte is predecoded. The length vector associated with the subsequent start byte is then used to determine the instruction byte in which the next instruction starts.

By utilizing the predecoded information from the predecode unit, the instruction alignment unit may be implemented with a relatively small number of cascaded levels of logic gates, thus accommodating very high frequencies of operation. Instruction alignment to decode units may further be accomplished with relatively few pipeline stages.

Broadly speaking, the present invention contemplates a predecode unit including a decode circuit, a prefix find circuit, a prefix accumulator and a tree circuit. The decode circuit is configured to decode a fixed number of instruction bytes in a clock cycle and to output a plurality of instruction length vectors. The prefix find circuit is configured to receive said fixed number of instruction bytes and to identify which of said fixed number of instruction bytes are prefixes. The prefix accumulator circuit is coupled to said decode circuit and said prefix find circuit, and is configured to output a plurality of position length vectors which identify an instruction length for potential start bytes. The tree circuit is coupled to said prefix accumulation circuit, and is configured to output a plurality of start bits. The start bits identify one or more start bytes within said fixed number of instruction bytes.

The present invention further contemplates a method of predecoding instruction bytes of variable-byte length instructions to identify start bytes of variable length instructions comprising: predecoding a fixed number of instruction bytes starting with an instruction byte identified by a predecode pointer, wherein said predecoding identifies said start bytes within said fixed number of instruction bytes; incrementing said predecode pointer by said fixed number of instruction bytes; and predecoding said fixed number of instruction bytes starting with an instruction byte identified by said predecode pointer.

The present invention still further contemplates a method of predecoding instruction bytes of variable-byte length instructions to identify start bytes of variable length instructions comprising: determining a first instruction length if a start byte is in a first byte position; determining a second instruction length if said start byte is in a second byte position; determining a location of a first start byte based upon an instruction byte position of a previous start byte and an instruction length associated with said previous start position; and selecting said first instruction length if said first start byte is in said first byte position and selecting said second instruction byte length if said first start byte is in said second byte position.

BRIEF DESCRIPTION OF THE DRAWINGS

Other objects and advantages of the invention will become apparently upon reading the following detailed description and upon reference to the accompanying drawings in which:

FIG. 1C is a diagram that illustrates several possible x86 addressing mode formats;

Figure 1A:
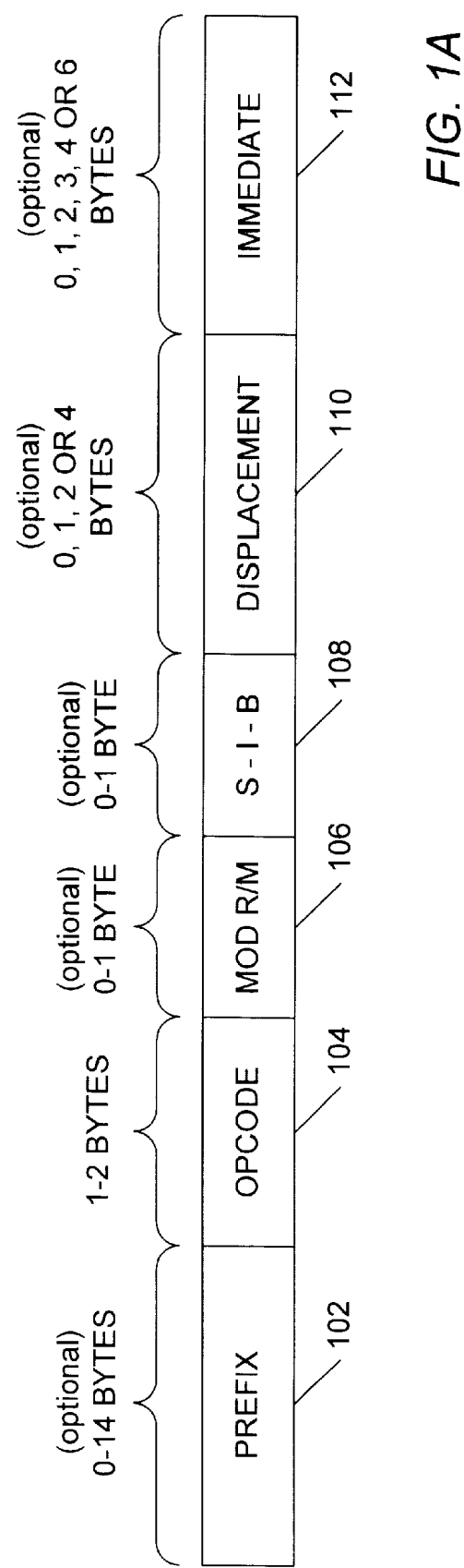
FIG. 1A is a diagram that illustrates a generic x86 instruction set format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the cony, the intention is to cover all

DETAILED DESCRIPTION OF THE DRAWINGS

Figure 2:
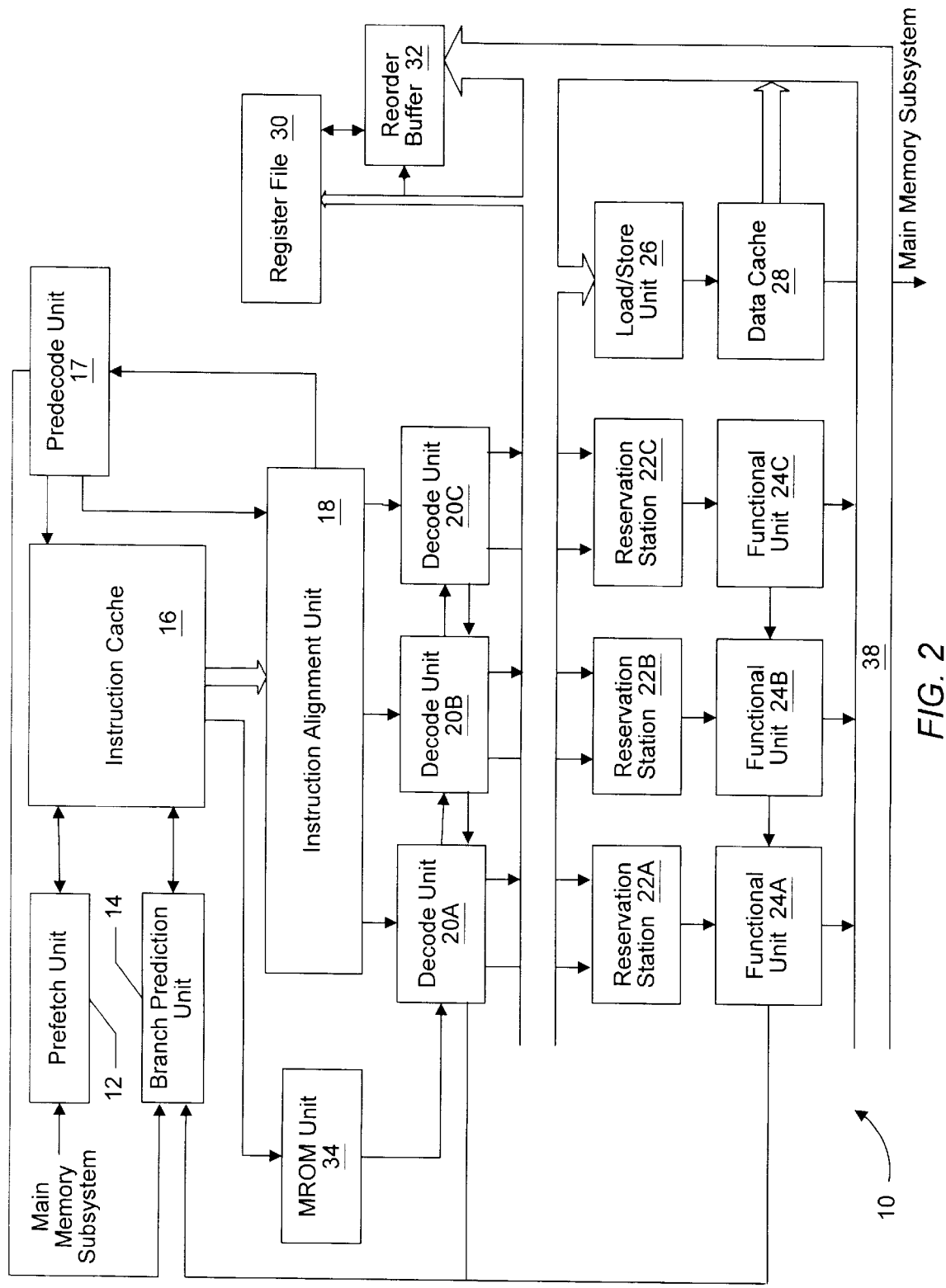
FIG. 2 is a block diagram of a superscalar microprocessor that includes a predecode unit and an instruction alignment unit to forward multiple instructions to three decode units.

Turning now to FIG. 2, a block diagram of one embodiment of a microprocessor 10 is shown. Other embodiments are possible and contemplated. As shown in FIG. 2, microprocessor 10 includes a prefetch unit 12, a branch prediction unit 14, an instruction cache 16, a predecode unit 17, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter may be collectively referred to by the reference number alone. For example, decode units 20A–20C may be collectively referred to as decode units 20.

Prefetch unit 12 is coupled to receive instructions from a main memory subsystem (not shown), and is further coupled to instruction cache 16. Branch prediction unit 14 is coupled to instruction cache 16 and predecode unit 17. Further, branch prediction unit 14 is coupled to decode units 20 and functional units 24. Instruction cache 16 is coupled to predecode unit 17, which is coupled to instruction alignment unit 18. Instruction cache is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, predecode unit 17 piedecodes a fixed number of instruction bytes per clock cycle. In one embodiment, the predecode unit predecodes four instruction bytes per clock cycle. The predecode unit determines a length vector for each of the four instruction bytes. The length vector identifies the length of an instruction if an instruction starts in the instruction byte corresponding to the length vector. Based on the length vector of an instruction byte in which an instruction starts, the instruction byte in which an subsequent instruction starts may be determined. If the instruction byte in which a subsequent instruction starts is not within the instruction bytes currently being predecoded, a tree circuit stores the information until the subsequent instruction byte is predecoded. It is noted that the predecode unit may additionally provide predecode bits which identify the end of an instruction, the type of instruction, and other information.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a two-way set associative structure having 64 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 maybe similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct-mapped configuration.

Instructions are fetched from main memory and stored into instruction cache 16 by prefetch unit 12. Instructions may be prefetched prior to the request thereof from instruction cache 16 in accordance with a prefetch scheme. A variety of prefetch schemes may be employed by prefetch unit 12. Prefetch unit 12 stores the prefetched instruction to instruction cache 16. Instruction cache 16 conveys instructions to instruction alignment 18. If the instructions received from instruction cache 16 have not been predecoded, the instructions are transferred to predecode unit 17. Predecode unit 17 may generate predecode bits for each byte of the instructions. The predecode bits are conveyed to both instruction alignment unit 18 and instruction cache 16. Instruction alignment unit 18 uses the predecode data to align the instruction for dispatch to decode units 20. Instruction cache 16 stores the predecode data with the instructions. The next time those instructions are conveyed to instruction alignment unit 18, the predecode bits are conveyed with the instructions, and transfer to predecode unit 17 may not be required.

In one embodiment, predecode unit 17 generates three predecode bits per instruction byte: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, predecode unit 17 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is asserted for the first instruction byte. Alternatively, for MROM instructions, the functional bit is unasserted for the first instruction byte The type of instruction may be determined by examining the functional bit corresponding to the first instruction byte. Prefix bytes are identified by an asserted functional bit in the position corresponding to the subsequent instruction byte. For example, if the first instruction byte is a prefix byte the second functional bit is asserted. The opcode of an instruction may thereby be located within an instruction as the byte associated with the last asserted functional bit in the instruction. For example, a fast path instruction including two prefix bytes, an opcode, a ModR/M byte, and an immediate byte would have stat, end, and functional bits as follows:

| | |
|---|---|
| Start bits | 10000 |
| End bits | 00001 |
| Functional bits | 01100 |

According to one particular embodiment, early identification of an instruction that includes a scale-index-base (SIB) byte is advantageous for MROM unit 34. For such an embodiment, if an instruction includes at least two bytes after the opcode byte, the functional bit for the ModR/M byte indicates the presence of an SIB byte. If the functional bit for the ModR/M byte is set, then an SIB byte is present. Alternatively, if the functional bit for the ModR/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Predecode unit 17 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results maybe discarded by reorder buffer 32.

Figure 1B:
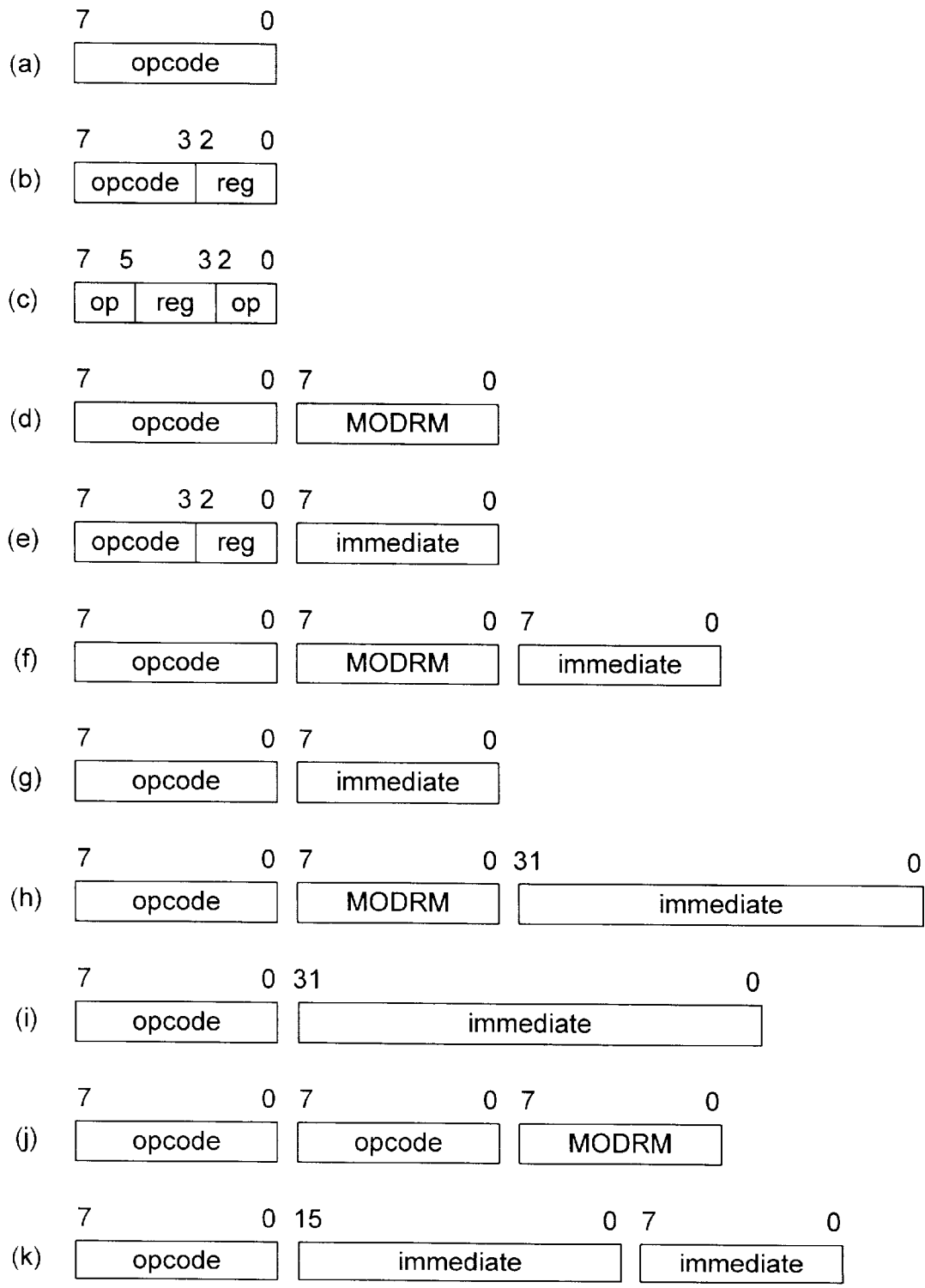
FIG. 1B is a diagram that illustrates several different variable byte-length x86 instruction formats.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to 64 kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are physically addressed and linearly indexed. It is noted that a physically addressed cache stores physical address tags.

Figure 3:
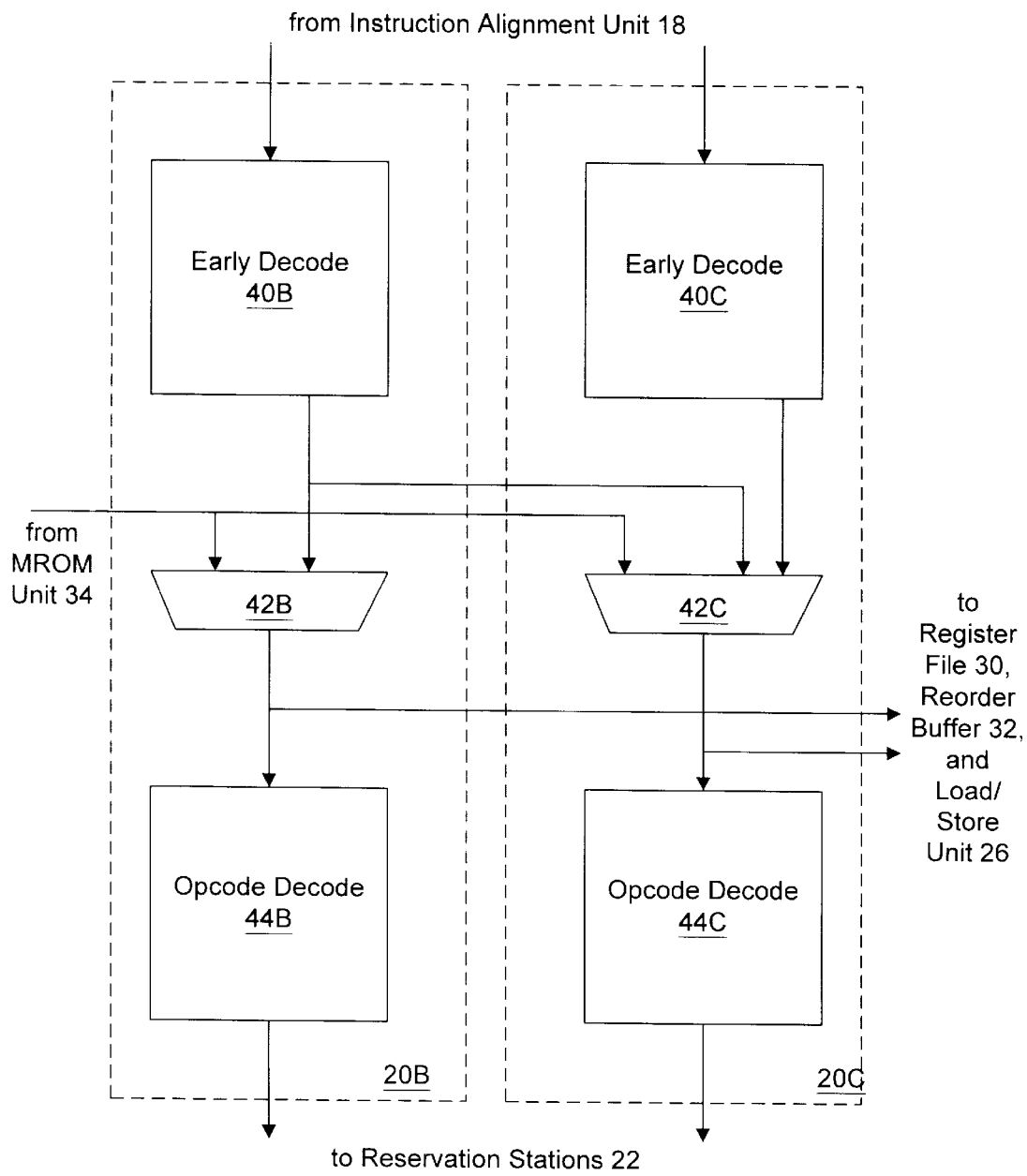
FIG. 3 is a block diagram of a decode unit according to one embodiment of the present invention.

Turning now to FIG. 3, a block diagram of one embodiment of decode units 20B and 20C is shown Other embodiments are possible and contemplated. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode source and destination flags;

(iii) decode the source and destination operands which are register operands and generate operand size information; and (iv) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 4:
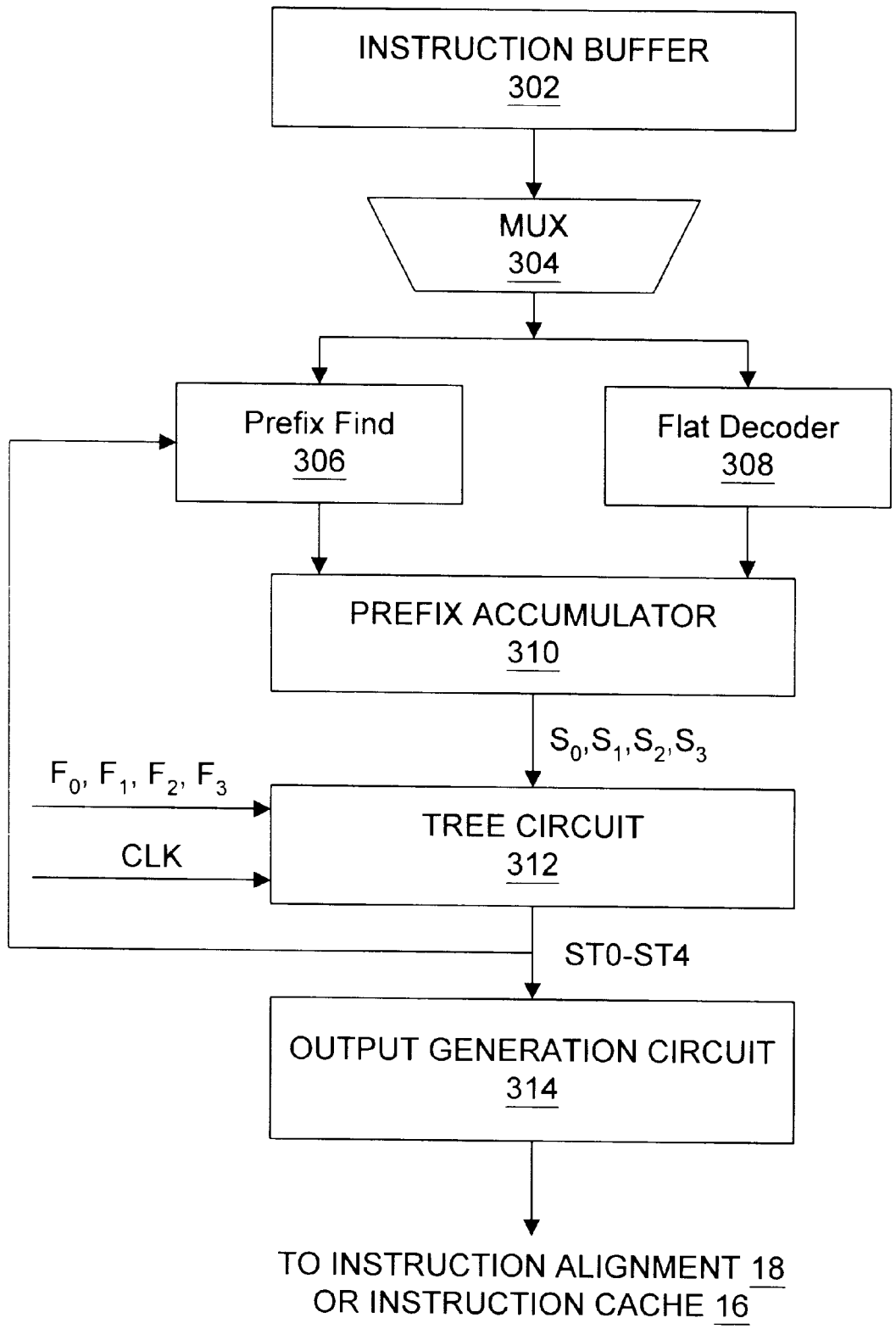
FIG. 4 is a block diagram of a portion of a predecode unit according to one embodiment of the present invention.

Turning now to FIG. 4, a block diagram of a portion of predecode unit 17 according to one embodiment of the present invention is shown. In the illustrated embodiment, the circuitry for generating start bits that identify instruction start bytes (i.e., the instruction bytes in which instructions start) is shown. Predecode unit 17 may additionally include circuitry for generating other predecode bits, which is not shown. The illustrated portion of prefetch unit 17 includes an instruction buffer 302, a multiplexer 304, a prefix find circuit 306, a flat decoder 308, a prefix accumulator 310, a tree circuit 312, and an output generation circuit 314.

Instruction buffer 302 receives instruction bytes from instruction alignment unit 18 (not shown). Multiplexer 304 routes a plurality of instruction bytes from instruction buffer 302 to prefix find circuit 306 and flat decoder 308. Prefix find circuit 306 outputs control signals to prefix accumulator 310 indicating which instruction bytes are prefixes and whether those prefix bytes effect the type or length of an instruction.

Multiplexer 304 additionally routes instruction bytes to flat decoder 308. Flat decoder 308 outputs a plurality of length vectors. Each length vector corresponds to an instruction byte. The length vectors identify the length of an instruction if an instruction starts in the instruction byte corresponding to the length vector. In one embodiment, the length vectors output by flat decoder 308 do not take into account prefix bytes. In one particular embodiment, flat decoder 308 outputs two length vectors for each instruction byte. A first length vector identifies the length of an instruction if no escape prefix byte is associated with the instruction. A second length vector identifies the length of an instruction if an escape prefix byte is associated with the instruction.

Prefix accumulator 310 receives the length vectors from flat decode 308 and the prefix information from prefix find circuit 306. Prefix accumulator 310 combines this information to determine the length of an instruction taking into account prefix bytes. Prefix accumulator 310 outputs a plurality of length vectors to tree circuit 312. Each length vector identifies the length of an instruction if an instruction starts in the instruction byte corresponding to the length vector.

Tree circuit 312 identifies instruction start bytes based upon instruction start bytes and the length of instructions starting at those start bytes. An instruction start byte may be identified by a previous instruction start byte and the length of that instruction, or may be identified by a source external to the predecode unit, such as a branch correction unit. The start byte of a subsequent instruction may be an instruction byte not present in the instruction bytes currently being predecoded. In this event, tree circuit 312 stores information indicative of the location of the instruction start byte and identifies that start byte when it is predecoded. Tree circuit 312 outputs a bit, called a start bit, for each instruction byte. The start bits indicate whether that instruction byte is a start byte. The start bits are provided to output generation circuit 314, which performs cleanup operations such as detecting branches, illegal opcodes, page faults and mixing of previously generated predecode bits.

In the illustrated embodiment, a fixed number of instruction bytes are predecoded each clock cycle. Decoding a fixed number of instruction bytes advantageously reduces the complexity of multiplexer 304 and decreases the latency of the predecode circuit. In one embodiment, the number of instruction bytes predecoded per clock cycle is equal to the number of instruction bytes prefetched per clock cycle. In a preferred embodiment, four instruction bytes are predecoded per clock cycle. In one embodiment, instruction buffer 302 includes a predecode pointer that identifies a first instruction byte to be predecoded. The predecode pointer is incremented each clock cycle. Accordingly, multiplexer 304 routes four instruction bytes to prefix find 306 in a first clock cycle and routes the subsequent four instruction bytes to prefix find 306 in the subsequent clock cycle. In the illustrated embodiment, multiplexer 304 routes seven instruction bytes to flat decoder 308. Flat decoder 308 receives the four instruction bytes received by prefix find 306 and the subsequent three instruction bytes. Flat decoder 308 uses the subsequent three instruction bytes to determine the instruction length if the fourth instruction byte is the first byte of an instruction. For example, the fourth instruction byte may be an escape prefix, the fifth instruction byte may be an opcode, the sixth instruction byte may be a ModR/M byte and the seventh instruction byte may be an SIB byte. In the subsequent clock cycle, flat decode circuit 308 receives that same four bytes as prefix find 306 and the subsequent three bytes. In other words, flat decoder 308 receives the last three instruction bytes it received in the previous clock cycle and the four subsequent instruction bytes.

By predecoding a fixed number of bytes per clock cycle, multiplexer 304 is designed to shift a fixed number of byte positions, which greatly simplifies the circuitry of the multiplexer. Further, the multiplexing operation may occur in parallel with the predecode function because the number of bytes by which the multiplexer shifts the instruction bytes is not dependent upon the outcome of the predecode. Accordingly, the operation of the predecode circuit may be performed in an expeditious manner.

Figure 5:
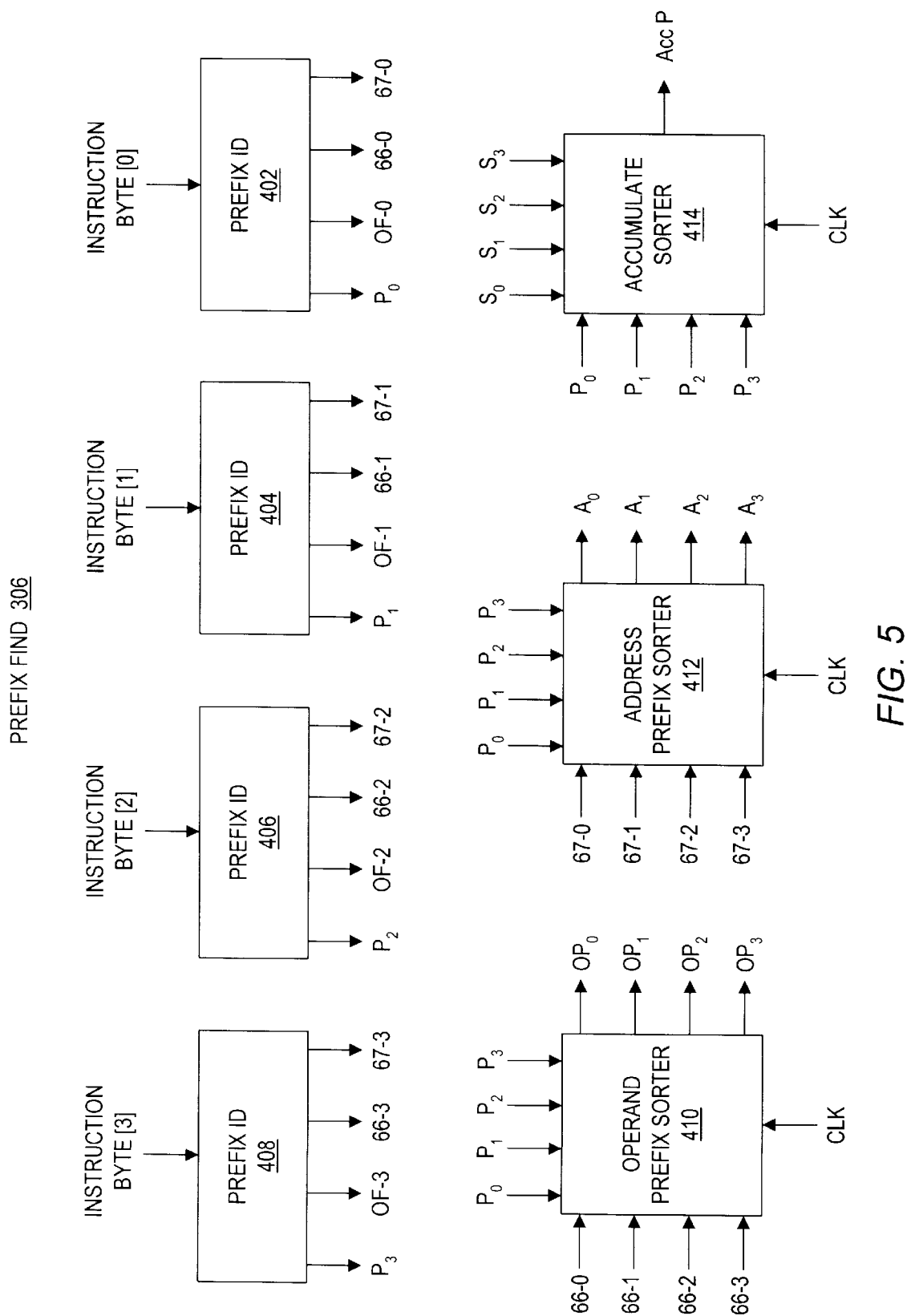
FIG. 5 is a block diagram of a prefix find circuit of a predecode unit according to one embodiment of the present invention.

Turning now to FIG. 5, a block diagram of prefix find circuit 306 of predecode unit 17 according to one embodiment of the present invention is shown. Prefix find 306 includes four prefix ID circuits 402–408, an operand prefix sorter 410, an address prefix sorter 412, and an accumulate sorter 414. Each prefix ID circuit is configured to receive an instruction byte and output a plurality of prefix control signals. In the illustrated embodiment, each prefix ID circuit outputs a prefix control signal indicating whether the instruction byte is a prefix byte, and if the instruction byte is a prefix byte, what type of prefix byte it is. For example, prefix ID 402 receives instruction byte 0 from multiplexer 304. It is noted that instruction byte 0 is earlier in program order than instruction byte 1, instruction byte 2 and instruction byte 3. Prefix ID 402 outputs a prefix signal (P0) that indicates whether instruction byte 0 is a prefix byte. It is noted, that prefix ID 402 may incorrectly identify a byte as a prefix byte. For example, a displacement or immediate byte may contain a valid prefix, such as 66 or 67. At this stage, prefix ID 402 is unable to distinguish whether the instruction byte is a prefix byte or another byte that includes a valid prefix code. As will be apparent from the discussion below, however, incorrectly identifying a displacement or immediate byte as a prefix byte will not adversely effect the operation of the circuit. Prefix ID 402 further outputs an escape prefix control signal (0F0) indicates that the prefix byte contains the escape prefix OF. Prefix ID 402 still further outputs an operand prefix signal (66-0) that indicates the prefix byte contains the operand size override prefix 66. Prefix ID 402 additionally provide an address prefix signal (67-0) that indicates the prefix byte contains the address size override prefix 67.

Prefix ID circuits 404–408 operate in the substantially same manner as prefix ID 402. Prefix ID 404 identifies whether instruction byte 1 is a prefix byte, and if so, whether it is an escape, address override or operand override prefix. Prefix ID 406 receives instruction byte 2 and identifies whether instruction byte 2 is a prefix byte, and if so, whether it is an escape, address override or operand override prefix. Prefix ID 408 receives instruction byte 3 and indicates whether instruction byte 3 is a prefix, and if so, whether instruction byte is an escape, address override or operand override prefix.

Operand prefix sorter 410 receives the prefix signals (P0–P4) and the operand prefix signals (66-0–66-3), and outputs four operand override prefix signals (OP0–OP3). The operand override prefix signals indicate whether an instruction byte includes an operand override prefix or an instruction byte is a prefix byte in a continuous chain of prefix bytes that includes an operand override prefix. For example, OP3 is asserted if instruction byte 3 is an operand override prefix byte. OP2 is asserted if either instruction byte 2 is an operand override prefix or if instruction byte 3 is an operand override prefix and instruction byte 2 is a prefix byte. OPI is asserted if instruction byte 1 is an operand override prefix; instruction byte 2 is an operand override prefix and instruction byte 1 is a prefix byte; or instruction byte 3 is an operand override prefix and instruction bytes 1 and 2 are prefix bytes. OP0 is asserted if instruction byte 0 is an operand override prefix, or OP1 is asserted and instruction byte 0 is a prefix byte. OP0 may additionally be asserted if a group of contiguous prefix bytes occupied the last instruction positions in the previous group of instruction bytes and the contiguous group of prefixes included an operand prefix override. The operation of operand prefix sorter 410 is discussed in more detail below in reference to FIG. 11.

Address prefix sorter 412 operates in substantially the same manner as operand prefix sorter 410. Address prefix sorter 412 receives the prefix signals (P0–P3) and the address prefix signals (67-0–67-3). Address prefix sorter 412 outputs four address override prefix signals (A0–A3) which are substantially similar to the operand prefix signals except they detect the presence of an address override prefix rather than an operand override prefix.

Accumulate sorter 414 receives the prefix signals (P0–P3) and the four start bits (S0–S3) from tree circuit 312. Accumulate sorter 414 outputs an accumulated prefix signal (AccP) that indicates that a contiguous group of prefix bytes followed the last start byte. For example, if an instruction started in instruction byte 1 of the previous group of instruction bytes and instruction bytes 1, 2 and 3 were prefix bytes, accumulator sorter 414 stores this information and asserts the accumulate prefix signal in the current clock cycle.

The accumulated prefix signal creates a false start byte in instruction byte 0. In other words, if a group of instruction bytes predecoded in a previous clock cycle ends with a contiguous group of instruction bytes after a start byte, the predecode unit treats the current group of instruction bytes as if a start byte occurs at instruction byte 0. As discussed above, if one of the contiguous group of prefix bytes was either an address or operand override, operand prefix sorter 410 and address prefix sorter 412 output a signal that indicates that instruction byte 0 includes an operand or address override prefix. Accumulate sorter 414 is discussed in more detail below in reference to FIG. 12.

Figure 6:
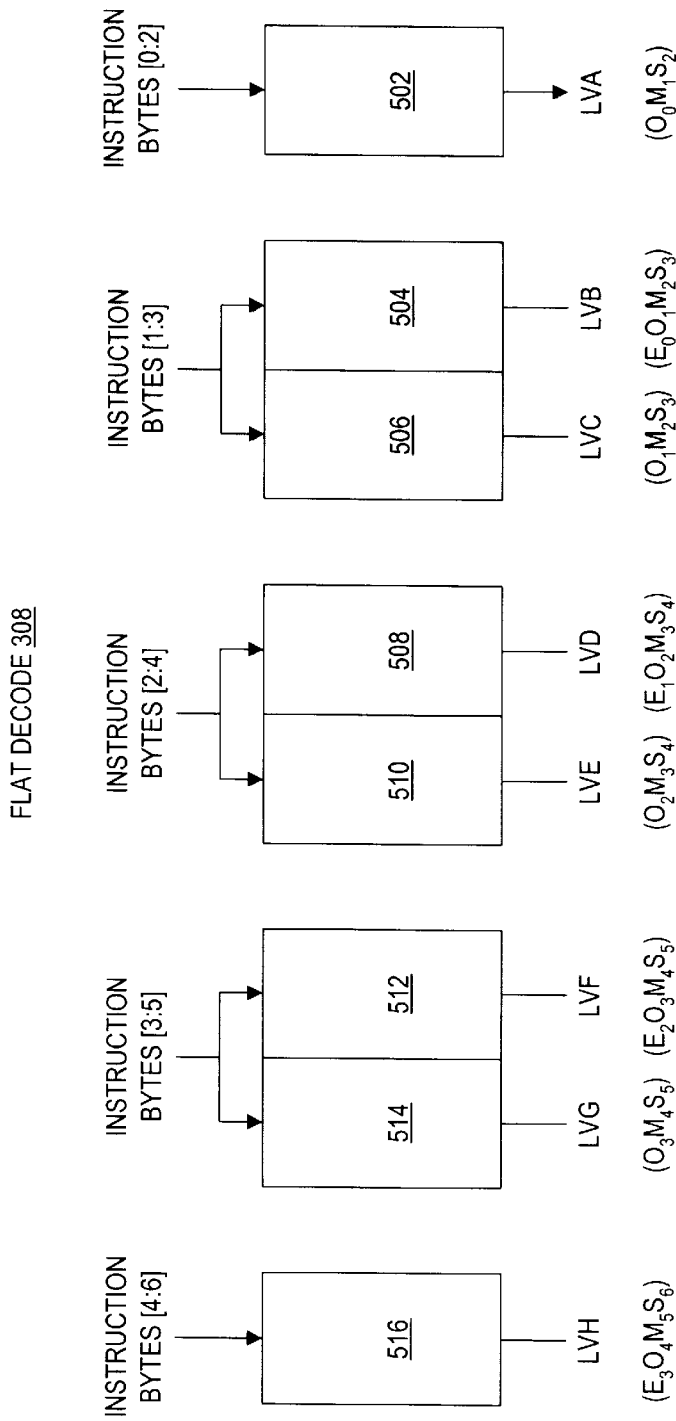
FIG. 6 is a block diagram of a flat decode circuit of a predecode unit according to one embodiment of the present invention.

Turning now to FIG. 6, a block diagram of flat decoder 308 of predecode unit 17, according to one embodiment of the present invention is shown. Flat decoder circuit 308 includes eight decode circuits (502–516). In the illustrated embodiment, each predecode circuit receives three instruction bytes. Each predecode circuit outputs a length vector that includes a root vector and a plurality of flags. The root vector identifies a preliminary estimate of the instruction length and the flags provide control signals used by prefix accumulator 310 to increase the instruction length depending upon the occurrence of prefix bytes and other factors. For example, the root vector may indicate that an instruction includes fives instruction bytes. The flags may indicate that instruction additionally includes two or four bytes of displacement data depending upon whether 16-bit or 32-bit addressing is selected. Accordingly, prefix accumulator 310, which is discussed in more detail below, may increase the instruction length by two or four bytes depending upon the prefix bytes and the state of the default bit.

Each decode circuit of flat decoder 308 computes the root vector and flags based on an assumption about which instruction byte is a start byte and whether a previous instruction byte is an escape prefix. For example, decoder 502 receives instruction bytes 0, 1 and 2 (instruction byte 0 is first in program order), and generates a root vector and flags based on the assumption that an instruction starts at instruction byte 0 and the previous instruction byte was not an escape prefix. Decoder 504 receives instruction bytes 1, 2 and 3, and generates a root vector and flags based on the assumption that the instruction starts at instruction byte 0 and instruction byte 0 is an escape prefix. Decoder 506 receives instruction bytes 1, 2 and 3, and generates a root vector and flags based on the assumption that the instruction starts in instruction byte 1 and instruction byte 1 is not an escape prefix. Decoder 508 receives instruction bytes 2, 3 and 4, and generates a root vector and flags based on the assumption that the instruction starts in instruction byte 1 and instruction byte 1 is an escape prefix. Decoder 510 receives instruction bytes 2, 3 and 4, and generates a root vector and flags based on the assumption that the instruction starts in instruction byte 2 and instruction byte 2 is not an escape prefix. Decoder 512 receives instruction bytes 3, 4 and 5, and generates a root vector and flags based on the assumption that the instruction starts in instruction byte 2 and instruction byte 2 is an escape prefix. Decoder 514 receives instruction bytes 3, 4 and 5, and generates a root vector and flags based on the assumption that the instruction starts in instruction byte 3 and instruction byte 3 is not an escape prefix. Decoder 516 receives instruction bytes 4, 5 and 6, and generates a root vector and flags based on the assumption that the instruction starts in instruction byte 3 and instruction byte 3 is an escape prefix. Accordingly, flat decoder 308 outputs eight length vectors (LVA–LVH) that are provided to prefix accumulator 310. As discussed in more detail below, prefix accumulator 310 selects length vectors based on the occurrence of escape prefixes, and uses the flags, operand override signals and address override signals to compute the actual length of an instruction if an instruction starts in an instruction byte corresponding to the length vector.

Figure 6A:
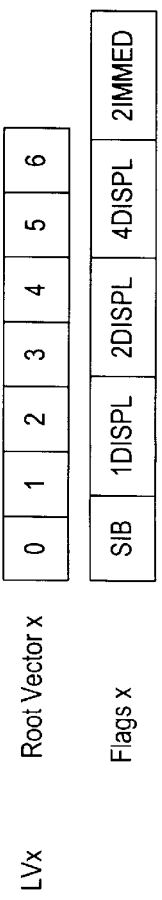
FIG. 6A is a diagram of a length vector according to one embodiment of the present invention.

Turning now to FIG. 6A, a diagram of a length vector according to one embodiment of the present invention is shown. In one embodiment, the length vector includes a root vector and a plurality of flags. The root vector indicates the length of the instruction based upon the presence of an escape prefix, an opcode byte, a ModR/M byte and a number of immediate bytes. In one specific embodiment, the number of immediate bytes accounted for in the root vector is 0, 1, 2, 3 or 4. Accordingly, the root vector may identify up to seven bytes of instruction length. In the illustrated embodiment, the root vector includes one bit for each potential number of instruction bytes. An asserted bit of the root vector indicates the length of the corresponding instruction. For example, if the corresponding instruction is one byte long (based on the above identified instruction bytes), then bit zero is asserted. If the corresponding instruction is two bytes long, then bit one is asserted, etc.

The length vector additionally includes a plurality of flags. In one embodiment, the length vector includes five flags: an SIB flag (SIB), a one displacement byte flag (1DISPL), a two displacement byte flag (2DISPL), a four displacement byte flag (4DISPL), and a two immediate byte flag (2IMMED). As noted above, the root vector and flags are used in conjunction with the prefix data from prefix find circuit 306 to arrive at the final length of the instruction. The use of the flags is discussed in more detail below in reference to FIGS. 7 and 13.

Figure 7:
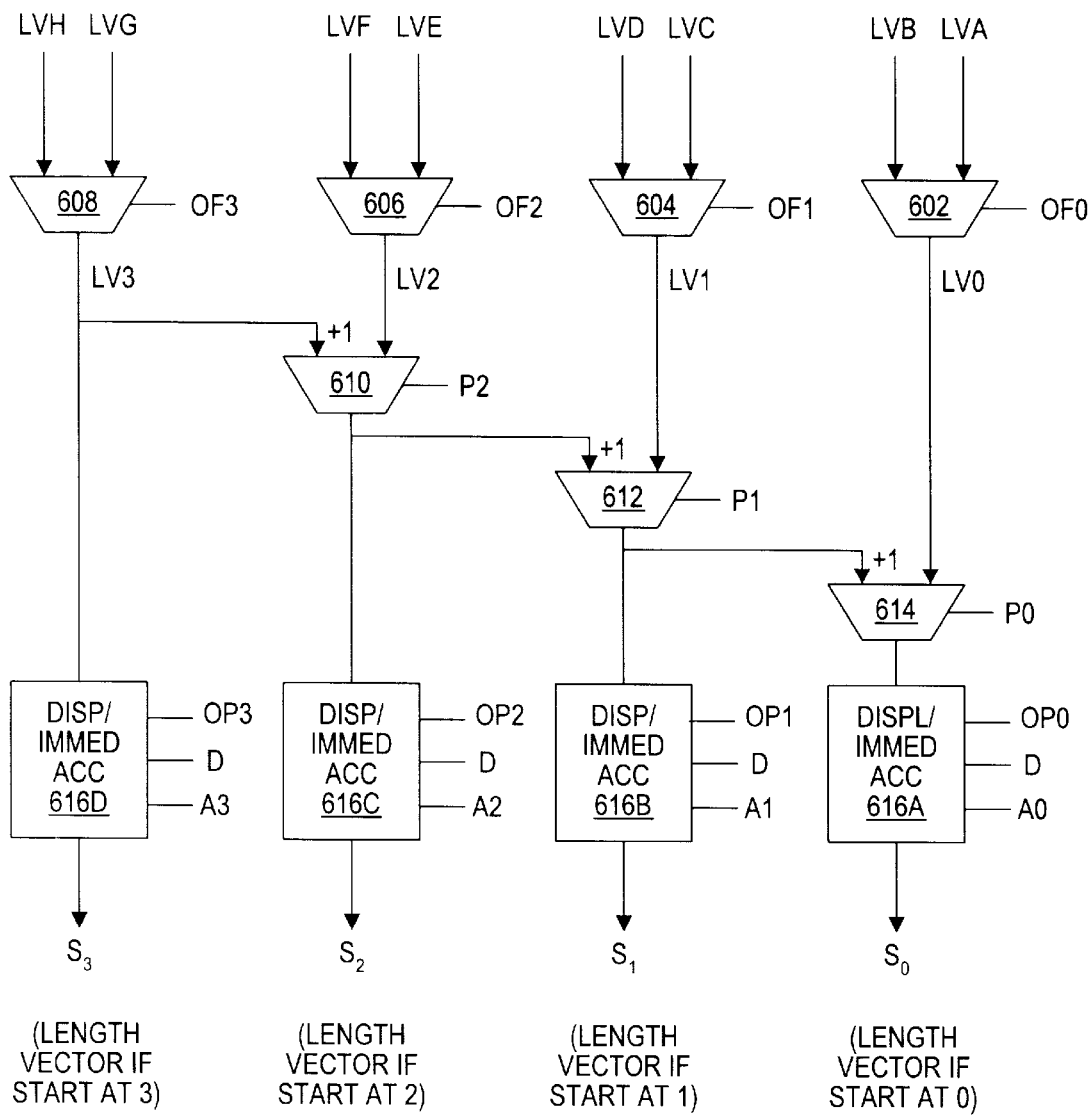
FIG. 7 is a block diagram of a prefix accumulator of a predecode unit according to one embodiment of the present invention.

Turning now to FIG. 7, a block diagram of prefix accumulator 310 of prefetch/predecode circuit 12 according to one embodiment of the present invention is shown. Prefix accumulator 310 includes multiplexers 602–614 and displacement/immediate accumulators 616A–616D. Multiplexers 602–608 are configured to select one of two length vectors corresponding to an instruction byte. As discussed above, two length vectors are generated for each instruction byte. One length vector assumes the first byte of the instruction is an escape prefix and the other length vector assumes the first instruction of the byte is not an escape prefix. For example, length vector A (LVA) is generated by decoder 502 of flat decoder 308 based on the assumption that an instruction starts in instruction byte 0 and instruction byte 0 is not an escape prefix, and length vector B (LVB) is generated based on the assumption that the instruction starts in an instruction byte 0 and instruction byte 0 is an escape prefix. Multiplexer 602 selects either LVA or LVB based upon the escape prefix control signal (0F0) from prefix find circuit 306. If 0F0 indicates that instruction byte 0 is an escape prefix, multiplexer 602 selects LVB. Alternatively, if 0F0 indicates that instruction byte 0 is not an escape prefix, multiplexer 602 selects LVA. Multiplexers 604, 606 and 608 operate in substantially the same manner. The outputs of multiplexers 602–608 are four length vectors (LV0–LV3) that each correspond to an instruction byte. For example, length vector 0 (LV0) corresponds to instruction byte 0, length vector 1 (LV1) corresponds to instruction byte 1, length vector 2 (LV2) corresponds to instruction byte 2 and length vector 3 (LV3) corresponds to instruction byte 3.

Multiplexers 610–612 shift the length vectors based upon the occurrence of prefix bytes in instruction bytes preceding the instruction byte corresponding to the length vector. For example, multiplexer 610 shifts LV3 by one position if a prefix byte is detected in instruction byte 2. As discussed above, LV3 is generated based on the assumption that the opcode or an escape prefix starts at instruction byte 3. If instruction byte 2 is a prefix, the instruction is one byte longer and starts in instruction byte 2 rather instruction byte 3. For example, consider a two-byte instruction starting in instruction byte 2. Instruction byte 2 is a prefix byte and instruction byte 3 is an opcode byte. The root vector of LV3 would detect the opcode byte at instruction byte 3 and identify the instruction as a one-byte instruction. Because instruction byte 2 is a prefix, multiplexer 610 will increase the length identified by the root vector of LV3 by one and couple LV3 to displacement/immediate accumulator 616C to indicate that the instruction is actually a two-byte instruction starting at instruction byte 2 rather than a one-byte instruction byte starting at instruction byte 3.

Multiplexers 612 and 614 operate in a substantially similar manner to multiplexer 610, and shift the length vector based on the number of prefix bytes preceding an instruction. It is noted, the multiplexers 610–614 increase the instruction length stored by the root vector when the length vector is shifted, but do not modify the flags of the length vector. The length vector is shifted by the number of contiguous prefix bytes preceding the instruction. For example, if an instruction in which the opcode starts in instruction byte 3 is preceded by three prefixes, the length vector will be shifted three positions (i.e. coupled to displacement immediate accumulator 616A) and the length identified by the root vector will be increased by 3. The case in which additional prefix bytes were present in a group of instruction bytes predecoded in a previous clock cycle is handled by the accumulate prefix signal of accumulate sorter 414. The accumulate prefix signal causes the predecode circuit to operate as if the instruction starts at instruction byte 0. Accordingly, the length of the instruction is determined from instruction byte 0 and any previous prefix bytes do not need to be accounted for in the root vector.

The shifted length vectors from multiplexers 610–614 are provided to displacement/immediate accumulators 616A–616D (collectively referred to as displacement/immediate accumulator 616). Displacement/immediate accumulator 616 determines the actual instruction length (not including prefix bytes prior to the current group of instruction bytes) if an instruction starts in the instruction byte corresponding to the shifted length vector. For example, the output of displacement/immediate accumulator 616A is a length vector that identifies the length of an instruction if instruction byte 0 is a start byte. Displacement/immediate accumulator 616 accounts for an SIB byte; zero, one, two, or four displacement bytes; and two additional immediate bytes. Displacement/immediate accumulator 616A determines whether any of these bytes are present based upon the flags of the length vector, the operand override prefix signals and address override prefix signals received from prefix find circuit 306, and the default bit (D), which identifies the default address and operand nodes. For example, displacement/immediate accumulator 616A may increase the length of the root vector based upon the flags of the length vector output by multiplexer 614, OP0, A0 and. Displacement/immediate accumulator outputs a length vector ($S_0$) to tree circuit 312. In one embodiment, the length vector is a fifteen bit long vector ($S_0L[0:14]$). An asserted bit of the length vector indicates the instruction length. For example, if the instruction is two bytes long, the $S_0L_1$ bit is asserted. In an alternative embodiment, the length vector may identify the last instruction byte in an instruction. In this embodiment, the start byte of the next instruction is the byte subsequent to the byte identified by the length vector. Displacement/immediate accumulators 616B–616D operate in substantially the same manner. The operation of displacement/immediate accumulator 616 is discussed in more detail below in reference to FIG. 13.

Figure 8A:
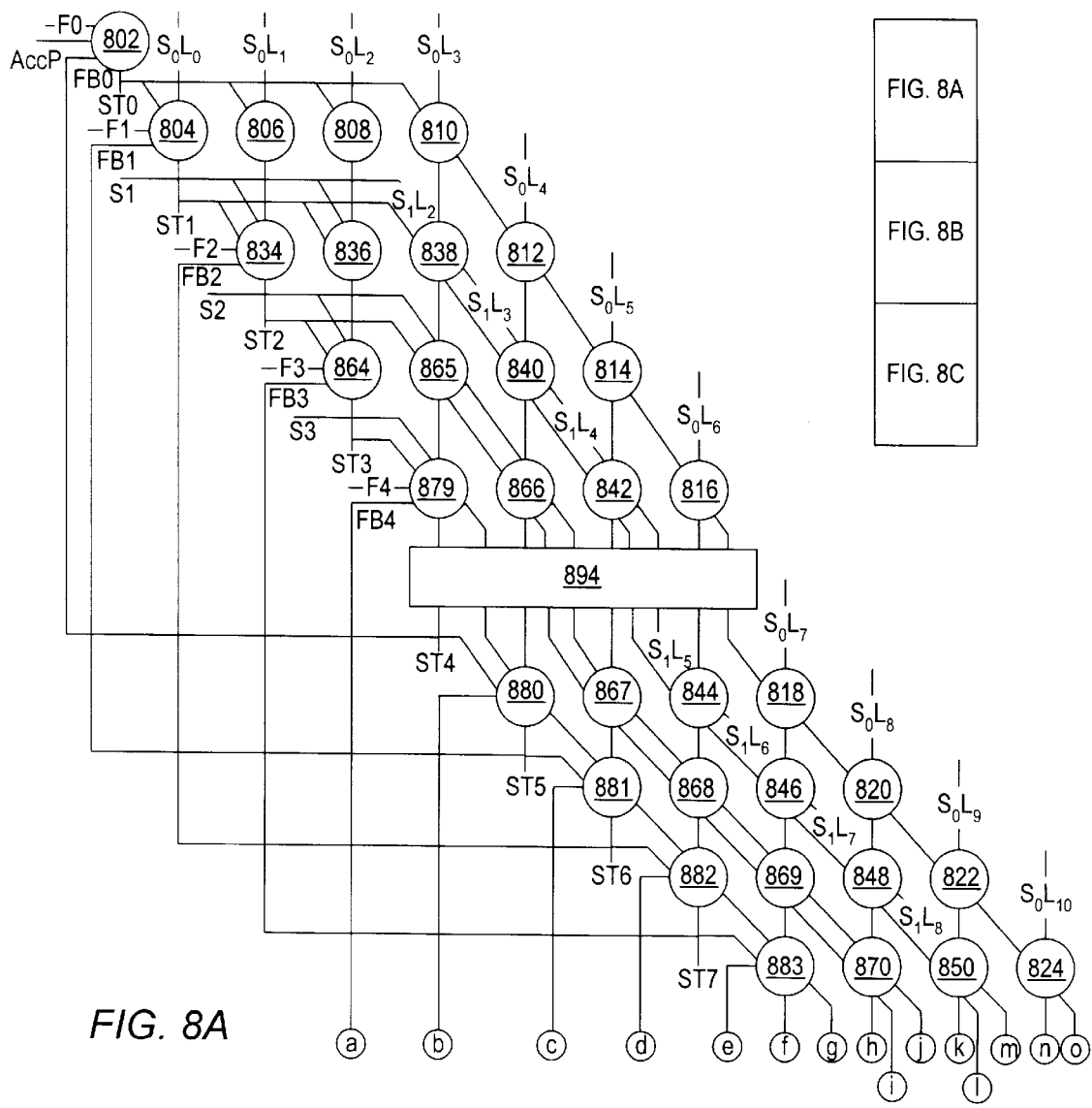
FIG. 8 is a block diagram of a tree circuit of a predecode unit according to one embodiment of the present invention.
Figure 8B:
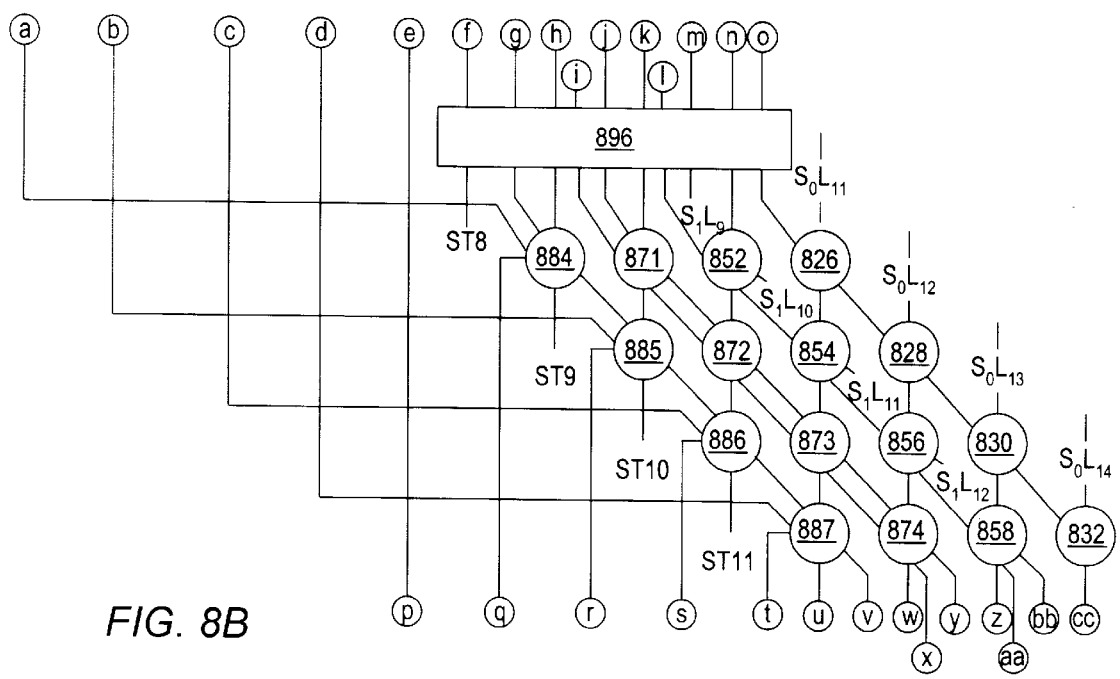
Figure 8C:
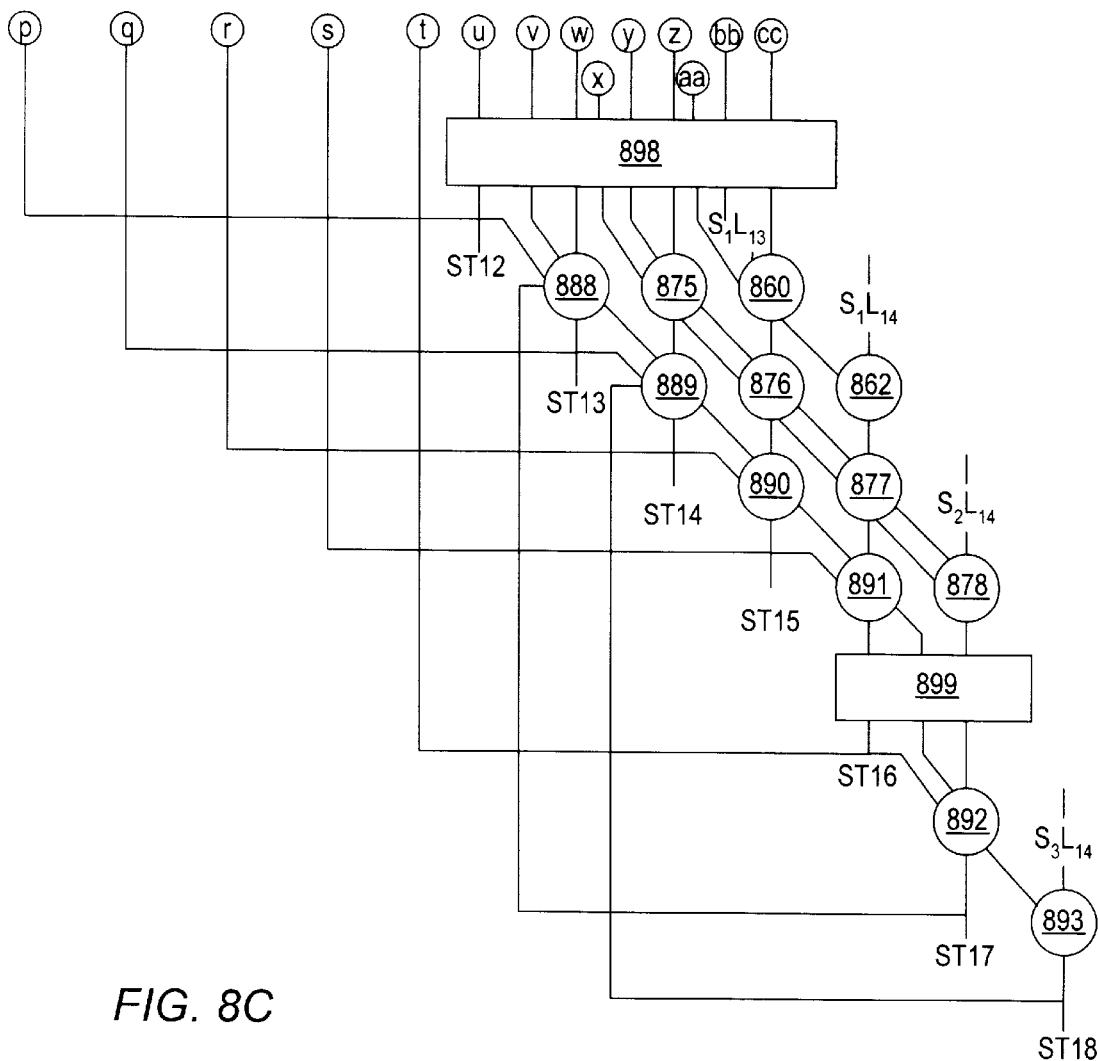

Turning now to FIG. 8, a block diagram of tree circuit 312 according to one embodiment of the present invention is shown. Generally speaking, tree circuit 312 determines a subsequent start byte from a current start byte and the length of the instruction starting at the current start byte. Tree circuit 312 outputs four start bits (ST0–ST3) that identify which, if any, of the predecoded instruction bytes are start bytes. For example, assume an instruction starts at instruction byte 0 and the length of the instruction starting in instruction byte 0 is two bytes long. Accordingly, the start zero (ST0) signal of node 802 and the second bit of start vector zero ($S_0L_1$) is asserted. ST0 and $S_0L_1$ are provided to node 806. Node 806 and node 834 will propagate the asserted $S_0L_1$ signal which causes ST2 to be asserted. ST2 indicates that another instruction starts in instruction byte 2. Further assume that the instruction starting at instruction byte two is five bytes long. This will cause $S_2L_4$ to be asserted. The asserted ST2 and $S_2L_4$ signals are stored in register 894. In the subsequent clock cycle, these signals are received by node 868 which will assert its output. Because the start three (ST3) signal is unasserted, node 882 will propagate the asserted output of node 868 to the start seven (ST7) signal. The ST7 signal is coupled to the feedback three (FB3) signal of node 864. The FB3 is signal will cause node 864 to assert the start three (ST3) signal. Accordingly, in the subsequent clock cycle the ST3 signal is asserted. Because four instruction bytes are decoded each clock cycle, the start byte corresponding to ST7 is predecoded in instruction byte three in the subsequent clock cycle. In the above described manner, tree circuit 312 stores information indicative of start bytes that are predecoded in future clock cycles. The identification of a start byte may be stored for several clock cycles. For example, if the instruction in the above described example was eight bytes long rather than five, the $S_2L_7$ signal is asserted. The ST2 signal and the $S_2L_7$ signal are provided to node 871 in the second clock cycle. In other words, the signals are stored by register 894 in a first clock cycle and register 896 in a second clock cycle. When node 871 receives the signals, it asserts its output which is propagated by node 885. Node 885 asserts the start ten (ST10) signal. The ST10 signal is coupled to the feedback six (FB6) signal of node 881 which asserts the start six (ST6) signal. The ST6 signal is coupled to the feedback two (FB2) signal of node 834, which asserts the ST2 signal. Accordingly, the ST2 signal is asserted two clock cycles after an eight byte instruction starting an instruction byte two is detected. The operation of tree circuit 312 will be discussed in more detail in conjunction with FIG. 9 in which the operation of nodes 802–810, 834–838, 864, 865 and 879 are discussed in more detail.

Buffers 894, 896, 898 and 899 store all control signals propagated to nodes below the buffer. For example, buffer 894 stores the ST0–ST4, $S_0L$ [7:15], $S_1L$ [5:15], $S_2L$ [3:15] and $S_3L$ [1:15] signals. Buffer 896 stores the ST0–ST4, $S_0L$ [11:15], $S_1L$ [9:15], $S_2L$ [7:15] and $S_3L$ [5:15] signals. Each buffer is coupled to a common clock signal.

Figure 9:
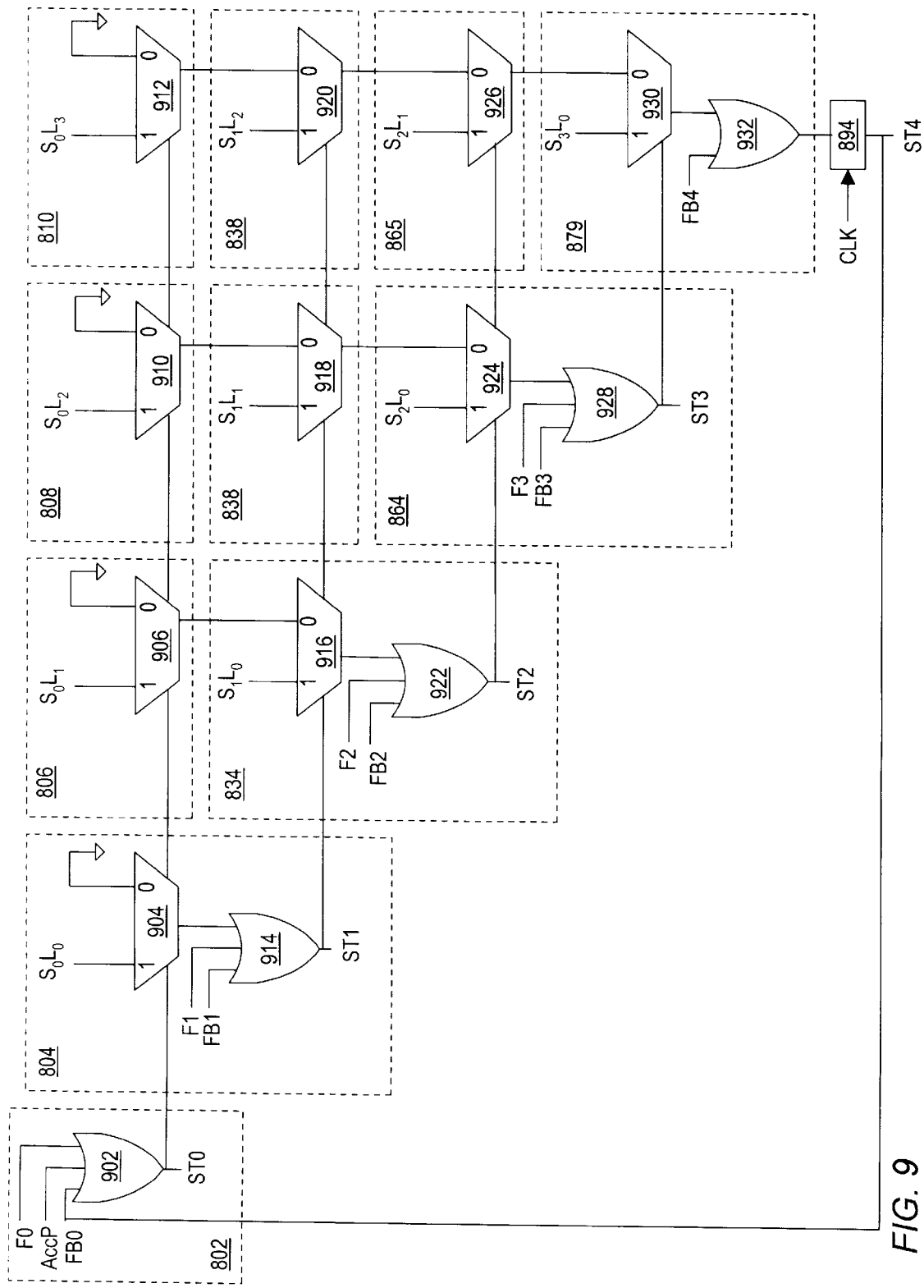
FIG. 9 is a circuit diagram of a portion of the tree circuit of FIG. 8 according to one embodiment of the present invention.

Turning now to FIG. 9, a circuit diagram of a portion of tree circuit 312 according to one embodiment of the present invention is shown. FIG. 9 shows more details of nodes 802–810, 834–838, 864, 865 and 879. Node 802 includes a three input OR-gate 902. If either the force start zero (F0) signal, the accumulate prefix (AccP) signal, or the feedback zero (FB0) signal are asserted, then OR-gate 902 asserts the start zero (ST0) signal. The ST0 signal indicates that an instruction starts in instruction byte 0. This situation may arise in three situations. First, a forced start signal may indicate that an instruction starts in an instruction byte 0. The forced start signal may be asserted to indicate a branch correction. For example, a branch misprediction may cause prefetch/predecode circuit 12 to fetch an instruction line and begin execution of that line out of sequence from the previous instructions. The force start signals identify in which byte to begin predecoding. Second, the FB0 signal may indicate that a start byte was detected in instruction byte 4 of a previous cycle. Instruction byte 4 in the previous cycle becomes instruction byte 0 in this cycle. Accordingly, if a start byte was detected in instruction byte 4 of the previous cycle, this information is stored in register 894 provided to OR gate 902, which asserts ST0. Lastly, ST0 may be asserted if the accumulate prefix signal is asserted. As discussed above, the accumulate prefix circuit creates a false start in instruction byte 0 if a contiguous group of prefix bits following a start bit is detected in the previous clock cycle.

The ST0 signal provides a control input to multiplexers 904, 906, 910 and 912. If ST0 is asserted, multiplexers 904–912 select the bit of length vector S0 coupled to the multiplexer. If ST0 is unasserted, the multiplexers select a logical 0. In node 804, the output of multiplexer 904 is provided to OR gate 914. OR gate 914 additionally receives inputs from the force start one (F1) signal and the feedback one (FB1) signal. FB1 is coupled to the start five (ST5) signal (not shown). OR gate 914 asserts ST1 if F1, FB1 or the output of multiplexer 904 is asserted. The output of multiplexer 904 is asserted if ST0 is asserted and bit zero of length vector S0 ($S_0L_0$) is asserted. $S_0L_0$ indicates that the length of the instruction starting at start bit zero is 1. In other words, if a one-byte instruction starts in position 0, another instruction starts in position 1. ST0 also provides a control signal to nodes 812–832 (not shown). Each of these nodes receives one bit of S0. For example, node 812 receives bit four of S0, node 814 receives bit five of S0, etc.

The ST1 signal provides a control signal to multiplexers 916, 918 and 920. If ST1 is asserted, these multiplexers select the respective bits of length vector S1. Alternatively, if ST1 is unasserted, multiplexers 916, 918 and 920 propagate the outputs of multiplexers 906, 910 and 912, respectively. ST1 also provides a control signal to nodes 840–862 (not shown). Each of those nodes receives one bit of S1.

The output of gate 916 is provided to OR gate 922. OR gate 922 asserts the start two (ST2) signal if the force start two F2) signal or the feedback 2 (FB2) signal is asserted. The FB2 signal is coupled to the start six (ST6) signal (now shown). OR gate 922 additionally asserts ST2 if the output of multiplexer 916 is asserted. The output of multiplexer 916 is asserted in two instances. First, the output of multiplexer 916 is asserted if ST1 is asserted and bit zero of length vector S1 of is asserted. This situation arises when a one-byte instruction starts in instruction byte one. Secondly, the output of multiplexer 916 is asserted if ST1 is deasserted, ST0 is asserted and bit one of length vector S0 is asserted. This situation arises if no instruction starts in instruction byte 1 and a two-byte instruction starts in instruction byte 0.

The ST2 signal provides a control signal to multiplexers 924 and 926. If ST2 is asserted, the multiplexers select the respective bits of length vector S2. Alternatively, if ST2 is unasserted, multiplexers 924 and 926 propagate the output of multiplexers 918 and 920, respectively. ST2 also provides a control signal to nodes 866–878 (not shown). Each of these nodes receives a bit of S2.

OR gate 928 is coupled to the force start three (F3) signal and the feedback three (FB3) signal, and the output of multiplexer 924. The FB3 signal is the buffered version of ST7 from the previous cycle. The ST3 signal is asserted if either the F3 signal, the FB3 signal, or the output of multiplexer 924 is asserted. The output of multiplexer 924 is asserted if either a one-byte instruction starts in instruction byte 2, a two-byte instruction starts in instruction byte 1, or a three-byte instruction starts in instruction byte 0.

The ST3 signal provides a control signal to multiplexer 930, which selects either bit zero of S3 or the output of multiplexer 926. ST3 provides a control signal to nodes 880–893 (not shown). Each of these nodes receives a bit of S3.

OR gate 932 outputs a start four (ST4) signal, which is provided to buffer 894. Buffer 894 stores the state of the ST4 signal and provides the signal to the FB0 input of node 802 in the subsequent clock cycle. The ST4 signal is asserted if either the feedback four (FB4) signal is asserted or the output of multiplexer 930 is asserted. The FB4 signal is coupled to the start eight (ST8) signal (not shown). The output of multiplexer 930 is asserted if a one-byte instruction starts in instruction byte three, a two-byte instruction starts in instruction byte 2, a three-byte instruction starts in instruction byte 1, or a four-byte instruction starts in instruction byte 0. It is noted, that nodes 880–893 operate in substantially the same manner as node 879 described above. It is further noted, that nodes 812–832, 840–862, 866–878 operate in substantially the same manner as nodes 806–810, 836, 838 and 865 described above.

Figure 10:
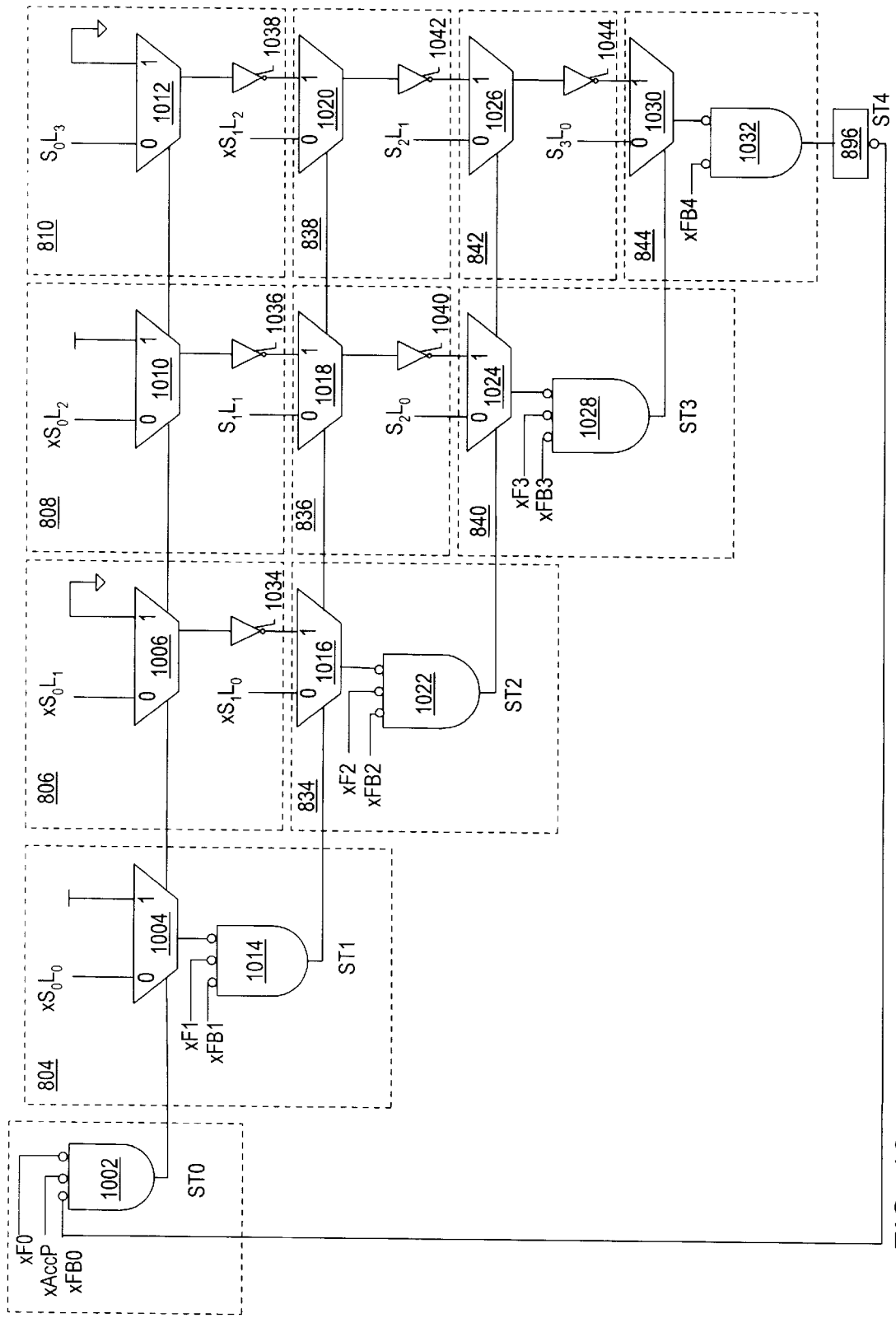
FIG. 10 is a circuit diagram of an alternate design of a portion of the tree circuit of FIG. 8 according to one embodiment of the present invention.

Turning now to FIG. 10, a circuit diagram of an optimized version of the portion of tree circuit 312 illustrated in FIG. 9 according to one embodiment of the present invention is shown. The same optimizations as illustrated in FIG. 10 may be applied to the remaining portion of tree circuit 312. In FIG. 10, OR gates 902, 914, 922, 928 and 932 are replaced with inverted-input AND gates 1002, 1014, 1022, 1028 and 1032. In this embodiment, the start signals implement negative logic. In other words, ST0–ST4 are "asserted" when they are a logical "0" rather than a logical "1". Multiplexers 1004–1012, 1016–1020, 1024 and 1030 are configured to select bits from the corresponding length vector when ST0 is asserted, or logical 0. It is noted that an input of multiplexers 1004 and 1010 are coupled to logical "1". In the illustrated embodiment, inverters 1034–1044 are added. In the illustrated embodiment, all paths propagate through the same number of gates. For example, the control signal to multiplexer 1004 passes through four logic gates regardless of the path by which it arrived. For example, the control signal may propagate through gates 1004, 1014, 1016 and 1022. Alternatively, the control signal may propagate through gates 1006, 1034, 1016 and 1022. Likewise, the inputs to multiplexer 1024 pass through four logic gates.

Figure 11:
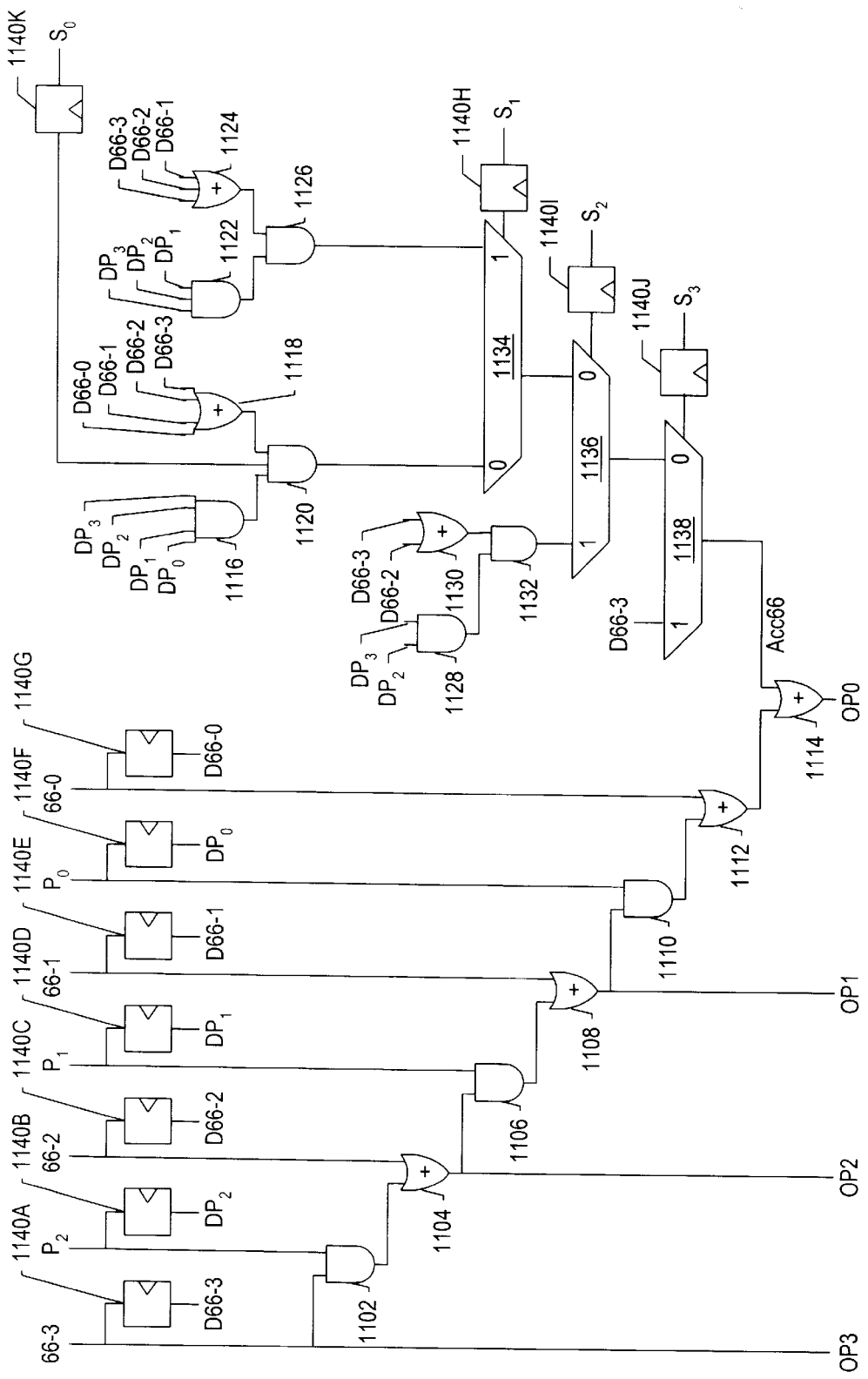
FIG. 11 is a circuit diagram of an operand prefix decode circuit of a prefix find circuit according to one embodiment of the present invention.

Turning now to FIG. 11, a circuit diagram of operand prefix sorter 410 according to one embodiment of the present invention is shown. Operand prefix sorter 410 outputs four operand override prefix signals (OP0–OP3). Operand prefix sorter 410 receives four operand prefix signals (66-0–66-3), four prefix signals (P0–P3), and four start signals (S0–S3). The operand prefix signals identify which instruction bytes include an operand override prefix. The prefix signals indicate which instruction bytes are prefix bytes. The start signals indicate which instruction bytes are start bytes. OP3 is asserted if 66-3 is asserted. OP2 is asserted if either 66-2 is asserted, or OP3 and P2 are asserted. OP1 is asserted if either 66-1 is asserted, or OP2 and P1 are asserted. OP0 is asserted if Acc66 or the output of OR gate 1112 is asserted. The output of OR gate 1112 is asserted if either 66-0 is asserted, or OP1 and P0 asserted.

The Acc66 signal indicates that a contiguous groups of instruction bytes previous to instruction byte 0 and after a start byte are prefix bytes, and one of those prefix bytes is an operand override prefix. The signals 66-0–66-3, P0–P3, and S0–S3 are stored for one clock cycle by flip-flops 1140A–1140K. The delayed version of these signals are used to generate Acc66. For example, DP0 is the delay version of P0. In other words, DP0 in the current clock signal has the same state as P0 in the previous clock cycle. Gates 1116–1138 implement the following logical equation:

if DS3, then Acc66=D66-3;

else if DS2, then Acc66=(DP2 DP3) (D66-3+D66-2);

else if DS1, then Acc66=(DP1,DP2 DP3) (D66-3+D66-2+D66-1);

else Acc66=(DS0) (DP0 DP1 DP2 DP3) (D66-0+D66-1+D66-2+D66-3).

Address prefix sorter 412 operates in substantially the same manner as operand prefix sorter 410. The operand prefix signals are replaced with address prefix signals (67-0–67-3), and address override prefix signals (A0–A3) are output.

Figure 12:
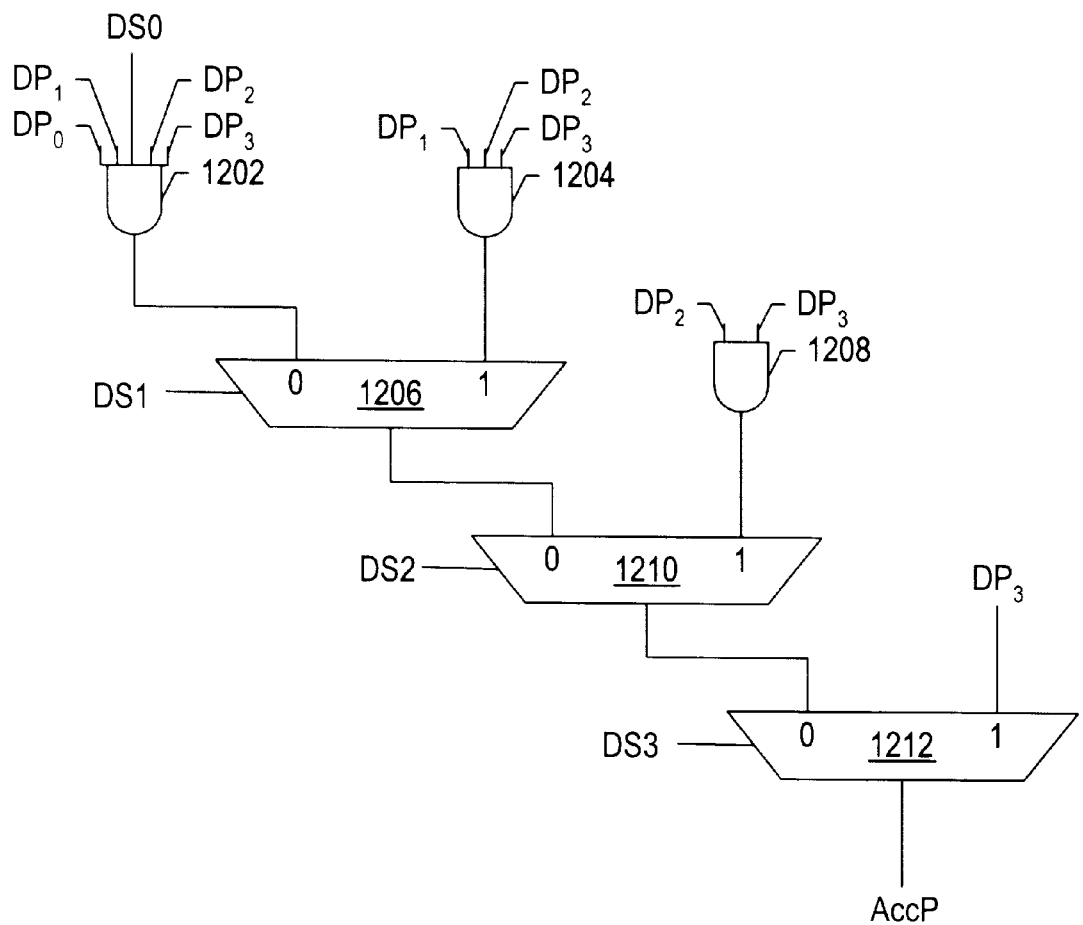
FIG. 12 is a circuit diagram of an accumulate decode circuit of a prefix find circuit according to one embodiment of the present invention.

Turning now to FIG. 12, a block diagram of accumulate sorter 414 of prefix find circuit 306 according to one embodiment of the present invention is shown. Accumulate sorter 414 uses the delayed versions of P0–P4 and S0–S4, discussed above in reference to FIG. 12, to generate the AccP signal. The AccP signal identifies whether instruction byte 0 was preceded by a contiguous group of prefix bytes following a start byte. The illustrated circuit implements the following logical equation:

if DS3, then AccP=DP3;

else if DS2 then AccP=DP2 DP3;

else if DS1, then AccP=DP1 DP2 DP3;

else AccP=DS0 DP0 DP1 DP2 DP3.

It is noted, that portions of accumulate sorter 414 replicate portions of operand prefix sorter 410 and address prefix sorter 412. Accordingly, in another embodiment, the circuits may be combined to reduce circuitry.

Figure 13:
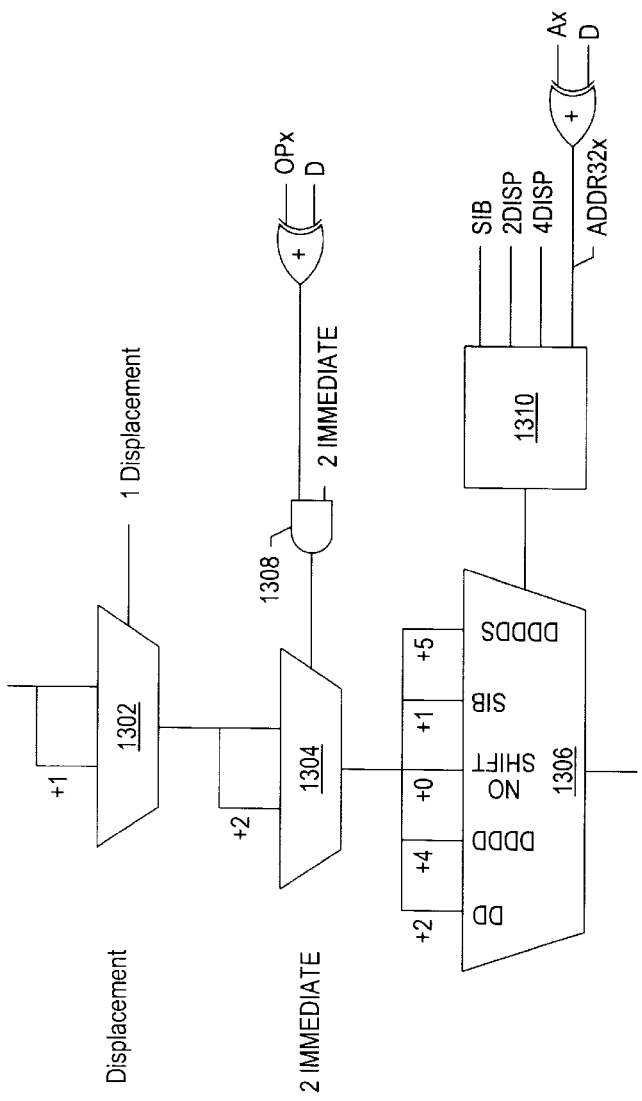
FIG. 13 is a circuit diagram of a displacement/immediate accumulator of a prefix accumulator according to one embodiment of the present invention.

Turning now to FIG. 13, a block diagram of displacement/immediate accumulator 616 of prefix accumulator 310 according to one embodiment of the present invention is shown. Displacement/immediate accumulator 616 includes multiplexers 1302, 1304 and 1306, AND gate 1308, exclusive-or gates 1312 and 1314 and logic circuit 1310. In the illustrated embodiment, displacement/immediate accumulator 616 increases the length of a root vector of an instruction based on the flags associated with the length vector, the operand override prefix signal, the address override prefix signal and the default bit (D). The ADDR32 signal is the exclusive-or of the default bit and the address override prefix signal (Ax). Each displacement/immediate accumulator 616 receives the flags, operand override prefix signal and address override prefix signal associated with that instruction. For example, displacement/immediate accumulator 61 6A of FIG. 7 receives operand override prefix signal 0 (OP0) and address override prefix signal (A0). Displacement/immediate accumulator 616A further receives the root vector and flags associated with the length vector output by multiplexer 614.

In the illustrated embodiment, multiplexer 1302 increases the length of the root vector, i.e. shifts the root vector, by one if the one displacement byte flag is asserted. The output of multiplexer 1302 is shifted by two if the two immediate byte flag is asserted and 32-bit operands are used. To determine whether 32-bit operands are used, the operand override prefix signal (OPx) is exclusive-ORed with the D bit. In one embodiment, the D bit is asserted if the default operand size is 32 bits and unasserted if the default operand size is 16 bits. If the operand override prefix signal is asserted the output of exclusive-OR gate 1212 is the inverse of the default bit. In one embodiment, the D bit is a code segment descriptor. If either 16-bit operands are used or the two immediate byte flag is unasserted, multiplexer 1204 does not shift the root vector.

Multiplexer 1306 shifts the output of multiplexer 1304 by zero, one, two, four, or five bytes depending on the output of logical circuit 1310. Logical circuit 1310 receives SIB flag, a two displacement byte flag, a four displacement byte flag, and a 32-bit address signal (ADDR32x). Based on these control signals, logical circuit 1310 determines whether the associated instruction includes an SIB byte, four displacement bytes and an SIB byte, two displacement bytes, or four displacement bytes. Logic circuit 1310 outputs control signals to multiplexer 1306 to shift the root vector by the appropriate number of bits. A truth table indicating the appropriate number of bits to shift the root vector based on the control signals received by logic circuit 1310 is shown in FIG. 13.

Figure 14:
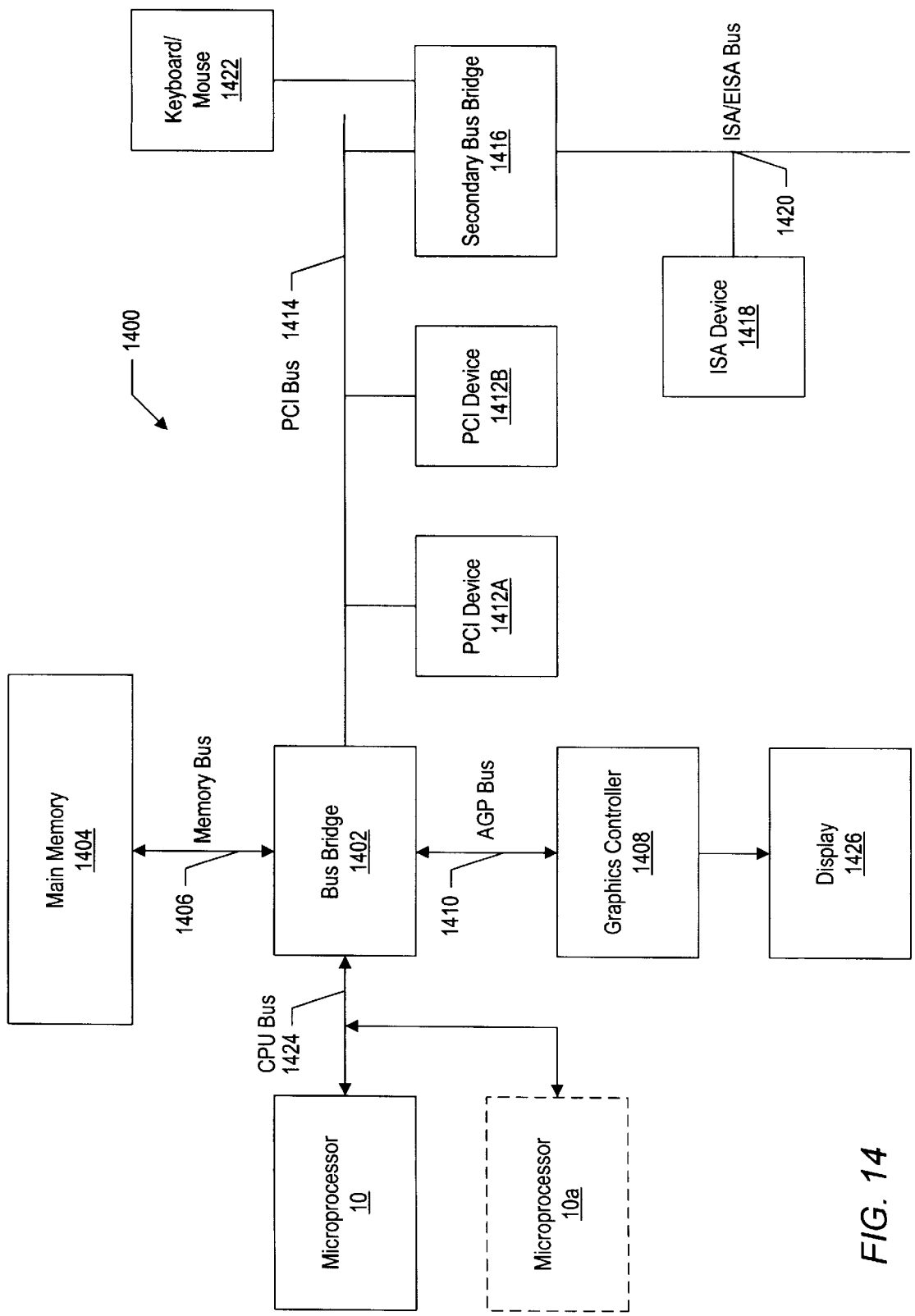
FIG. 14 is a computer system implementing the microprocessor of FIG. 2 according to one embodiment of the present invention.

Turning now to FIG. 14, a block diagram of one embodiment of a computer system 1400 including microprocessor 10 coupled to a variety of system components through a bus bridge 1402 is shown. Other embodiments are possible and contemplated. In the depicted system, a main memory 1404 is coupled to bus bridge 1402 through a memory bus 1406, and a graphics controller 1408 is coupled to bus bridge 1402 through an AGP bus 1410. Finally, a plurality of PCI devices 1412A–1412B are coupled to bus bridge 1402 through a PCI bus 1414. A secondary bus bridge 1416 may further be provided to accommodate an electrical interface to one or more EISA or ISA devices 1418 through an EISA/ISA bus 1420. Microprocessor 10 is coupled to bus bridge 1402 through a CPU bus 1424.

Bus bridge 1402 provides an interface between microprocessor 10, main memory 1404, graphics controller 1408, and devices attached to PCI bus 1414. When an operation is received from one of the devices connected to bus bridge 1402, bus bridge 1402 identifies the target of the operation (e.g. a particular device or, in the case of PCI bus 1414, that the target is on PCI bus 1414). Bus bridge 1402 routes the operation to the targeted device. Bus bridge 1402 generally translates an operation from the protocol used by the source device or bus to the protocol used by the target device or bus.

In addition to providing an interface to an ISA/EISA bus for PCI bus 1414, secondary bus bridge 1416 may further incorporate additional functionality, as desired. For example, in one embodiment, secondary bus bridge 1416 includes a master PCI arbiter (not shown) for arbitrating ownership of PCI bus 1414. An input/output controller (not shown), either external from or integrated with secondary bus bridge 1416, may also be included within computer system 1400 to provide operational support for a keyboard and mouse 1422 and for various serial and parallel ports, as desired. An external cache unit (not shown) may further be coupled to CPU bus 1424 between microprocessor 10 and bus bridge 1402 in other embodiments. Alternatively, the external cache maybe coupled to bus bridge 1402 and cache control logic for the external cache may be integrated into bus bridge 1402.

Main memory 1404 is a memory in which application programs are stored and from which microprocessor 10 primarily executes. A suitable main memory 1404 comprises DRAM (Dynamic Random Access Memory), or preferably a plurality of banks of SDRAM (Synchronous DRAM).

PCI devices 1412A–1412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 1418 is illustrative of various types of peripheral devices, such as a modem, a sound card, and a variety of data acquisition cards such as GPIB or field bus interface cards.

Graphics controller 1408 is provided to control the rendering of text and images on a display 1426. Graphics controller 1408 may embody a typical graphics accelerator generally known in the art to render three-dimensional data structures which can be effectively shifted into and from main memory 1404. Graphics controller 1408 may therefore be a master of AGP bus 1410 in that it can request and receive access to a target interface within bus bridge 1402 to thereby obtain access to main memory 1404. A dedicated graphics bus accommodates rapid retrieval of data from main memory 1404. For certain operations, graphics controller 1408 may further be configured to generate PCI protocol transactions on AGP bus 1410. The AGP interface of bus bridge 1402 may thus include functionality to support both AGP protocol transactions as well as PCI protocol target and initiator transactions. Display 1426 is any electronic display upon which an image or text can be presented. A suitable display 1426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 1400 may be a multi-processing computer system including additional microprocessors (e.g. microprocessor 10a shown as an optional component of computer system 1400). Microprocessor 10a may be similar to microprocessor 10. More particularly, microprocessor 10a may be an identical copy of microprocessor 10. Microprocessor 10a may share CPU bus 1424 with microprocessor 10 (as shown in FIG. 14) or may be connected to bus bridge 1402 via an independent bus.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encoding may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

What is claimed is:

1. A predecode unit comprising:

a decode circuit configured to decode a fixed number of instruction bytes in a clock cycle and to output a plurality of instruction length vectors, wherein each instruction length vector corresponds to a particular instruction byte and represents a length of a potential instruction assuming that the potential instruction starts at the particular instruction byte;

a prefix find circuit configured to receive said fixed number of instruction bytes and to identify which of said fixed number of instruction bytes are possible prefixes by comparing the value of each instruction byte with a set of possible prefix byte values, wherein the prefix find circuit is configured to prospectively identify instruction bytes that are not prefix bytes as prefixes if the instruction bytes have values that are in the set of possible prefix byte values;

a prefix accumulator circuit coupled to said decode circuit and said prefix find circuit and configured to output a plurality of position length vectors which identify an instruction length for potential start bytes, wherein said position length vectors are based on said instruction length vectors and are adjusted by said identified prefixes; and a tree circuit coupled to said prefix accumulation circuit and configured to generate and output a plurality of start bits based on the position length vectors from the prefix accumulator circuit and start byte information stored in the tree circuit from previously decoded instruction bytes, wherein said start bits identify one or more start bytes within said fixed number of instruction bytes.

2. The predecode unit of claim 1 further comprising a multiplexer coupled to said decode circuit and said prefix find circuit, and configured to output a fixed number of instruction bytes to said decode circuit and said prefix find circuit each clock cycle.

3. The predecode unit of claim 2 further comprising an instruction buffer coupled to said decode circuit and said prefix find circuit and configured to store a plurality of instruction bytes, wherein the buffer is configured to output the fixed number of instruction bytes from the plurality of instructions bytes.

4. The predecode unit of claim 2 wherein said fixed number of instruction bytes is four instruction bytes.

5. The predecode unit of claim 2 wherein said buffer includes a predecode pointer which identifies a first instruction byte of said fixed number of instruction bytes.

6. The predecode unit of claim 5 wherein said predecode pointer is incremented by said fixed number of instruction bytes each clock cycle whereby said predecode unit predecodes said fixed number of instruction byte each clock cycle.

7. The predecode unit of claim 1 wherein said prefix find circuit identifies which of said fixed number of instruction bytes are operand override prefixes, address override prefixes and escape code prefixes.

8. The predecode unit of claim 7 wherein said decode unit outputs one instruction length vector associated with each of said fixed number of instruction bytes, wherein each of said instruction length vectors identifies a number of instruction bytes if an instruction starts at said instruction byte associated said instruction length vector.

9. The predecode unit of claim 7 wherein said decode unit outputs a plurality of instruction length vectors associated with each of said fixed number of instruction bytes, wherein said prefix accumulator selects one of said instruction length vectors for each of said fixed number of instruction bytes based upon said prefixes identified by said prefix find circuit.

10. The predecode unit of claim 9 wherein said tree circuit determines a location of said start bytes based upon an instruction byte position of a start byte and an instruction length vector associated with said start byte.

11. The predecode unit of claim 10 wherein if a start byte is in an instruction byte subsequent to the instruction bytes predecoded in a clock cycle, said tree circuit stores information indicative of a location of said start byte and identifies said start byte when said instruction byte is predecoded.

12. The predecode unit of claim 1, wherein the prefix find circuit and the predecode circuit are configured to operate in parallel.

13. The predecode unit of claim 1, wherein the decode circuit is configured to output a second plurality of instruction length vectors, wherein each of the second plurality of instruction length vectors correspond to a particular instruction byte and represents a length of a potential instruction starting at the particular instruction byte assuming that an escape prefix byte is associated with the particular instruction being decoded.

14. A method for predecoding instruction bytes forming variable length instructions, the method comprising:

receiving a plurality of instruction bytes;

dividing the instruction bytes into groups having a fixed number of bytes;

examining each byte of each group in parallel to determine if the byte is a potential prefix byte;

generating a root vector and a plurality of flags for each group, wherein the root vector identifies a preliminary length estimate assuming an instruction begins at the first byte of the group, and wherein the plurality of flags identify the possible presence of one or more instruction length modifying prefix bytes in the group;

selecting a particular root vector based on the occurrence of the potential prefix bytes;

using the flags corresponding to the selected root vector to compute an actual length of an instruction starting at the current start byte; and determining a subsequent start byte from a current start byte and the length of the instruction starting at the current start byte.

15. The method of claim 14, wherein said examining and said generating are performed in parallel.

16. The method of claim 14, further comprising routing fixed numbers of instruction bytes to a prefix find unit and a flat decode unit, wherein the prefix find unit is configured to perform said examining, and wherein the flat decode unit is configured to perform said generating.

17. The method of claim 14, further comprising generating a second root vector, wherein the second root vector identifies a preliminary length estimate assuming an instruction begins at the first byte of the subgroup and assuming the presence of an escape prefix byte.

18. A microprocessor comprising:

a means for decoding a fixed number of instruction bytes in a clock cycle and outputting a plurality of instruction length vectors, wherein each instruction length vector corresponds to a particular instruction byte and represents a length of a potential instruction starting at the particular instruction byte;

a means for finding prefixes, wherein the means for finding is configured to receive said fixed number of instruction bytes and to assert flags indicative of which of said fixed number of instruction bytes are possible prefixes by comparing the value of each instruction byte with a set of possible prefix byte values, wherein the means for finding is configured to prospectively identify instruction bytes that are not prefix bytes as prefix bytes if the instruction bytes have values that are in the set of possible prefix byte values;

a means for accumulating prefix information, wherein the means for accumulating is coupled to said means for decoding and said means for finding prefixes, and wherein said means for accumulating is configured to output a plurality of position length vectors which identify instruction lengths for potential start bytes based on the flags from the prefix finding means and the instruction length vectors from the decoding means; and a circuit means coupled to said prefix accumulation circuit and configured to output a plurality of start bits based on (a) the position length vectors from the accumulating means, and (b) previously stored start byte information, wherein said start bits identify one or more start bytes within said fixed number of instruction bytes.

19. The microprocessor of claim 18, further comprising a multiplexer coupled to said means for decoding and said means for finding prefixes, and configured to output a fixed number of instruction bytes to said decode circuit and said prefix find circuit each clock cycle.

20. The microprocessor of claim 18, wherein the means for finding prefixes and the means for decoding are configured to operate in parallel.

* * * * *

UNITED STATES PATENT AND TRADEMARK OFFICE
CERTIFICATE OF CORRECTION

PATENT NO. : 6,260,134 B1
DATED : July 10, 2001
INVENTOR(S) : Gerald D. Zuraski, Jr., Syed F. Ahmed and Paul K. Miller It is certified that error appears in the above-identified patent and that said Letters Patent is hereby corrected as shown below:

Title page, Item [54] and Column 1,
The correct title is -- PROCESSOR CONFIGURED TO PREDECODE INSTRUCTIONS USING FIXED SHIFT AMOUNTS --.

Signed and Sealed this

Eleventh Day of June, 2002

*Attest:*

*Attesting Officer*

JAMES E. ROGAN
*Director of the United States Patent and Trademark Office*